United States Patent
Kawabata et al.

(10) Patent No.: US 9,200,955 B2
(45) Date of Patent: Dec. 1, 2015

(54) MULTI-OPTICAL-AXIS PHOTOELECTRIC SENSOR HAVING AN INTER-OPTICAL-AXIS INDICATION UNIT

(71) Applicant: Keyence Corporation, Osaka (JP)

(72) Inventors: Shinji Kawabata, Osaka (JP); Daishiro Ishikawa, Osaka (JP)

(73) Assignee: Keyence Corporation, Osaka (JP)

( * ) Notice: Subject to any disclaimer, the term of this patent is extended or adjusted under 35 U.S.C. 154(b) by 331 days.

(21) Appl. No.: 13/792,397

(22) Filed: Mar. 11, 2013

(65) Prior Publication Data

US 2013/0270423 A1   Oct. 17, 2013

(30) Foreign Application Priority Data

Apr. 11, 2012   (JP) ................................. 2012-090614

(51) Int. Cl.
*G01J 1/44* (2006.01)
*G01V 8/20* (2006.01)

(52) U.S. Cl.
CPC .... *G01J 1/44* (2013.01); *G01V 8/20* (2013.01)

(58) Field of Classification Search
CPC ........................................................ G01V 8/20
USPC ........................................ 250/221; 340/556
See application file for complete search history.

(56) References Cited

U.S. PATENT DOCUMENTS

| | | | |
|---|---|---|---|
| 5,302,942 | A | 4/1994 | Blau |
| 5,424,532 | A | 6/1995 | Occheto et al. |
| 5,596,310 | A | 1/1997 | Itoh |
| 6,414,603 | B1 | 7/2002 | Yamaguchi et al. |
| 6,894,623 | B2 | 5/2005 | Hama et al. |
| 6,979,814 | B2 | 12/2005 | Kudo et al. |
| 7,122,782 | B2 | 10/2006 | Sakaguchi |
| 7,348,537 | B2 | 3/2008 | Akagi et al. |
| 7,485,841 | B2 * | 2/2009 | Inoue et al. ................... 250/221 |
| 7,550,708 | B2 | 6/2009 | Deguchi |
| 2011/0226938 | A1 | 9/2011 | Tagashira |

FOREIGN PATENT DOCUMENTS

| | | |
|---|---|---|
| JP | 11-345548 | 12/1999 |
| JP | 2003-218679 | 7/2003 |
| JP | 2008-181788 | 8/2008 |
| JP | 2009-010817 | 1/2009 |

* cited by examiner

*Primary Examiner* — Tony Ko
(74) *Attorney, Agent, or Firm* — Kilyk & Bowersox, P.L.L.C.

(57) ABSTRACT

A demand for downsizing of a multiple optical-axis photoelectric sensor can be coped with, and various state displays are performed.
An inter-optical-axis indication unit is arranged between two adjacent optical axes so as not to interfere with the optical axis located in a lower end portion of a receiver. The inter-optical-axis indication unit is capable of displaying at least one piece of information out of a control input state, a safe special function state, a synchronization type, and an interlock state.

11 Claims, 16 Drawing Sheets

FIG. 5
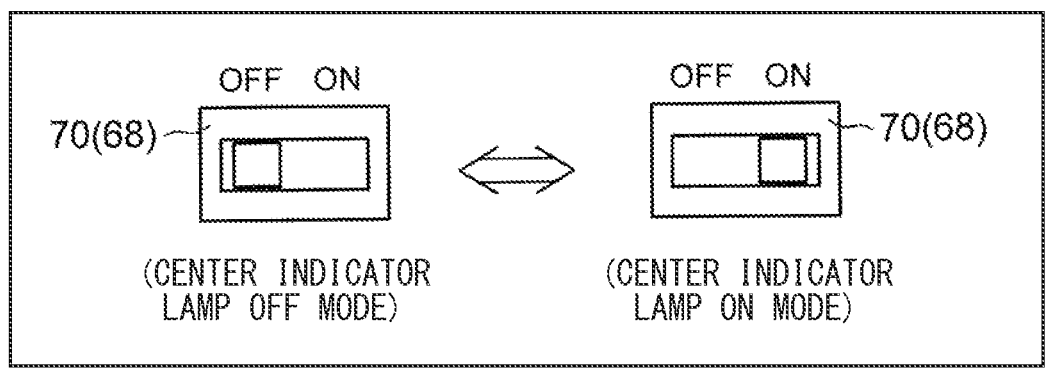
FIG. 6
| WIRED SYNCHRONIZATION | WIRELESS OR OPTICAL SYNCHRONIZATION | | |
|---|---|---|---|
| | FC 0 | FC A | FC B |
| 0 0<br>0 0 | ≡ | 🇦 | 🇧 |
FIG. 7
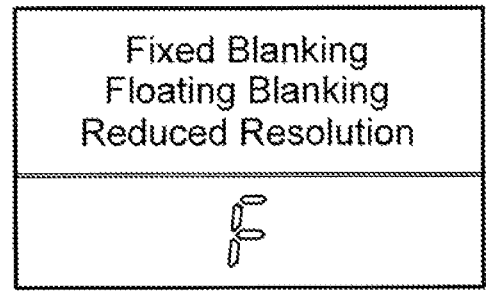

FIG. 8

| DISPLAY | Error name |
|---|---|
| E2 | Connection Error |
| E4 | Setting SW Error |
| E5 | Software Configuration error |
| E7 | Interlock Error |
| E8 | EDM Error |
| E10 | Receiver Error |
| E12 | Transmitter Error |
| E14 | OSSD1 Error |
| E15 | OSSD2 Error |
| E17 | OSSD Current Error |
| E18 | Sub Unit Error |
| E20 | Communication Error |

FIG. 9

| Display | Description |
|---|---|
| E24 | Muting Lamp Open |
| E25 | Muting Lamp Over Current |
| E27 | Function Error |
| E4_ | E40~ System Error |

FIG. 10

| DISPLAY | Condition |
|---|---|
| ⁻ | Muting input 1 is ON-state |
| _ | Muting input 2 is ON-state |
| ⁻_ | Muting input 1 and 2 are ON-state, but muting function is not activated. |
| 8→8→8→8→8→8 | Muting function is activated *Light 1 segment sequentially |
| 8→8→8→8 | Override input is ON-state (If Override function is activated, Light 1 segment sequentially.) |

FIG. 11

| DISPLAY | Condition |
|---|---|
| 00 W | Wait input is ON-state |

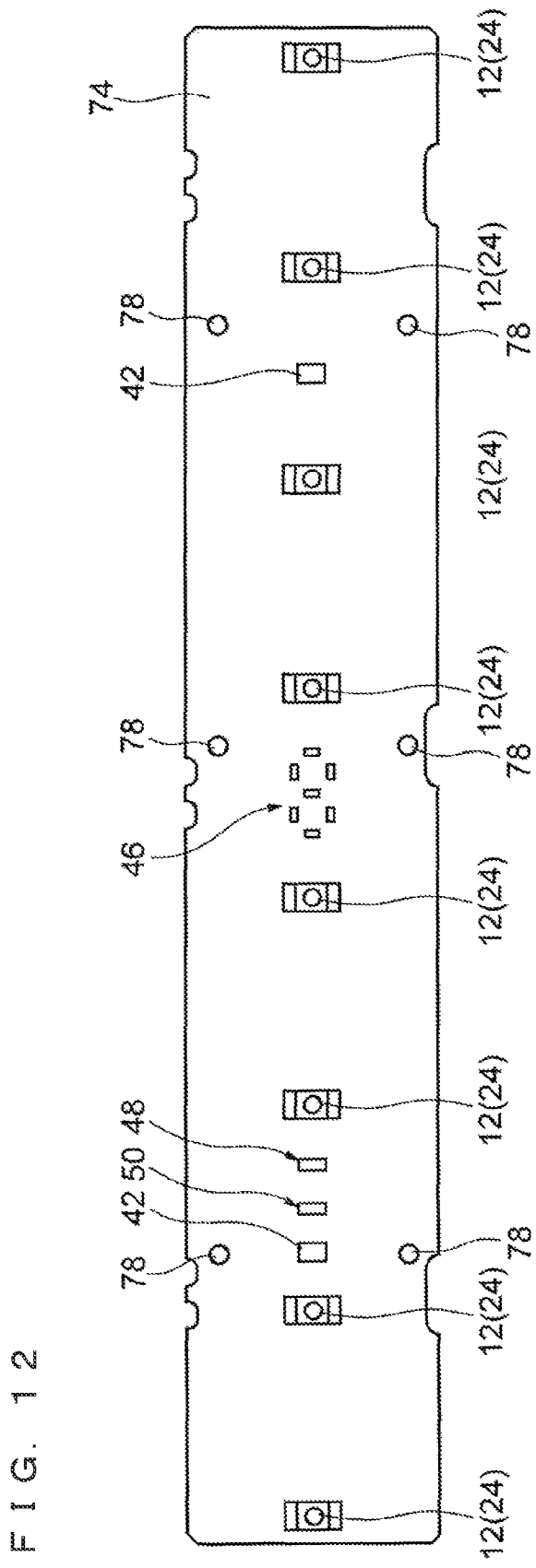

MULTI-OPTICAL-AXIS PHOTOELECTRIC SENSOR HAVING AN INTER-OPTICAL-AXIS INDICATION UNIT

CROSS-REFERENCE TO RELATED APPLICATIONS

The present application claims foreign priority based on Japanese Patent Application No. 2012-090614, filed Apr. 11, 2012, the contents of which is incorporated herein by reference.

BACKGROUND OF THE INVENTION

1. Field of the Invention

The present invention relates to a multiple optical-axis photoelectric sensor for forming a light curtain that detects invasion into a hazardous region in order to prevent inadvertent access to a hazardous source such as a press machine.

2. Description of Related Art

A multiple optical-axis photoelectric sensor is often used for ensuring the safety of a machine regarded as a hazardous source such as a press machine. The multiple optical-axis photoelectric sensor is generally configured by a pair of a transmitter and a receiver, and these transmitter and receiver form a light curtain. The light curtain has a plurality of optical axes, and light interception of the optical axis is detected to thereby forcibly suspend the operation of the hazardous source.

In recent years, there are an increasing number of multiple optical-axis photoelectric sensors adopting infrared optical axes. In the multiple optical-axis photoelectric sensor using infrared rays, the presence of the light curtain is not visible, and hence there has been proposed a multiple optical-axis photoelectric sensor provided with a row of indicators on the same axis as a row of optical axes and arranged adjacent to the optical axes (Japanese Unexamined Patent Publication No. 2008-181788).

Further, there has already been proposed a multiple optical-axis photoelectric sensor including indicators that display various errors (Japanese Unexamined Patent Publication No. H11-345548). As for the indicators disclosed in Japanese Unexamined Patent Publication No. H11-345548, a plurality of narrow indicators are longitudinally arrayed in a bar form on the side surface of a case for the multiple optical-axis photoelectric sensor, and by means of lighting patterns of these indicators in the bar form, it is possible to perform a state display of a light-receiving amount shortage, reception of disturbance light, and other abnormalities, in addition to the presence or absence of light interception.

Japanese Unexamined Patent Publication No. 2009-10817 discloses a multiple optical-axis photoelectric sensor provided with a pair of hard projections on both sides of a detection surface located on a front surface of a case for the multiple optical-axis photoelectric sensor. In this multiple optical-axis photoelectric sensor provided with the pair of projections, even when a bar collides with the front surface, for example, the bar is received by the pair of projections, thereby allowing prevention of the detection surface from being damaged.

When a wide light curtain is to be made, in the example of a multiple optical-axis photoelectric sensor configured by a transmitter and a receiver as a typical example, a spacing between the transmitter and the receiver is set to be relatively large (lengthening of the range of the maximum allowable span). In the multiple optical-axis photoelectric sensor that allows the range-lengthening, it is necessary to increase a light amount of the light-projecting element, increase a size of a lens that is installed in front of the light-projecting element, and enhance the light-receiving sensitivity. Meanwhile, it is also necessary to enlarge a state display disposed in the multiple optical-axis photoelectric sensor, so as to enhance visibility.

However, in the case of designing the case for the multiple optical-axis photoelectric sensor to be as slim as possible, how and where in the case for the multiple optical-axis photoelectric sensor the indicators for performing a state display are arranged become a technical object.

A principal part of the elongated case for the multiple optical-axis photoelectric sensor is often made of an extrusion-molded article, and installing the indicator in this extrusion-molded article portion not only requires post-processing such as opening a hole in the extrusion-molded article, but may also cause weakening of the case.

Further, in each of recent multiple optical-axis photoelectric sensors, an inter-optical-axis pitch tends to be made shorter so as to ensure advanced safety, and associated with this, package densities of the light-projecting element and the light-receiving element housed inside the case are made higher. Naturally, there is also a demand for downsizing of the multiple optical-axis photoelectric sensor, thereby making it increasingly difficult to ensure a space for installation of the indicators.

SUMMARY OF THE INVENTION

An object of the present invention is to provide a multiple optical-axis photoelectric sensor capable of coping with a demand for downsizing and also capable of performing various state displays.

Another object of the present invention is to provide a multiple optical-axis photoelectric sensor which is provided with a pair of projections and capable of performing various state displays without inhibiting characteristics of the multiple optical-axis photoelectric sensor.

According to the present invention, the above technical object can be achieved by providing a multiple optical-axis photoelectric sensor, which is provided with a longitudinally extending detection surface of an elongated case and arrayed with a plurality of optical axes at regular intervals in agreement with the longitudinally extending detection surface, the sensor including: an inter-optical-axis indication unit provided between two adjacent optical axes; and a display controlling unit for causing the inter-optical-axis indication unit to display at least one piece of information out of a control input state, a safe special function state, a synchronization type, and an interlock state.

Herein, examples of the control input state may include a muting input, an override input, and a wait input. Further, a typical example of a safe output is an OSSD output. Moreover, examples of the safe special function state may include a muting state, an override state, a reduced resolution state, and fixed blanking state. When the reduced resolution or the fixed blanking state is activated by setting, the safe special function enters an operating state, and hence it is indicated that the setting state of the safe special function and the operating state of the safe special function are substantially the same. However, when the muting or the override is activated by setting, it does not enter the muting state or the override state as long as another condition is met, and hence it is indicated that the setting state of the safe special function and the operating state of the safe special function are substantially different. The safe special function state includes the setting state of the safe special function and the operating state of the safe special function.

In a preferred embodiment of the present invention, the inter-optical-axis indication unit includes indicators capable of performing switch-displays of at least two pieces of information out of a control input state, a safe special function state, a synchronization type, and an error type, a safe output indicator lamp for displaying a safe output state of the multiple optical-axis photoelectric sensor, and an interlock indicator lamp for displaying the interlock state.

A 7-segment indicator cannot display a number of digits greater than the number of digits thereof. In this case, when information in amount exceeding the displayable information amount is to be displayed, the information may be divided and displayed in a time-series manner. In a typical example of the present invention, a 1-digit 7-segment indicator is adopted.

Another object and function effect of the present invention will become apparent from a detailed description of the preferred embodiment of the present invention described below.

BRIEF DESCRIPTION OF THE DRAWINGS

FIG. 5 is an extracted view of a switch being part of a switch group mounted on the lower end of the longitudinally-disposed multiple optical-axis photoelectric sensor (receiver) of the first embodiment illustrated in FIG. 1;

FIG. 6 is a view illustrating a display example of a 7-segment indicator installed between the optical axes of the multiple optical-axis photoelectric sensor (receiver) of the first embodiment illustrated in FIG. 1;

FIG. 7 is a diagram illustrating another display example of the 7-segment indicator;

FIG. 8 is a list of display codes which displays various errors by use of the 7-segment indicator;

FIG. 9 is a list of display codes which displays various errors by use of the 7-segment indicator, continued from FIG. 8;

FIG. 10 is a view illustrating another display example of the 7-segment indicator;

FIG. 11 is a view illustrating still another display example of the 7-segment indicator;

FIG. 12 is a view illustrating a circuit board incorporated in a case for the multiple optical-axis photoelectric sensor of the first embodiment;

DETAILED DESCRIPTION OF PREFERRED EMBODIMENTS

Figure 1:
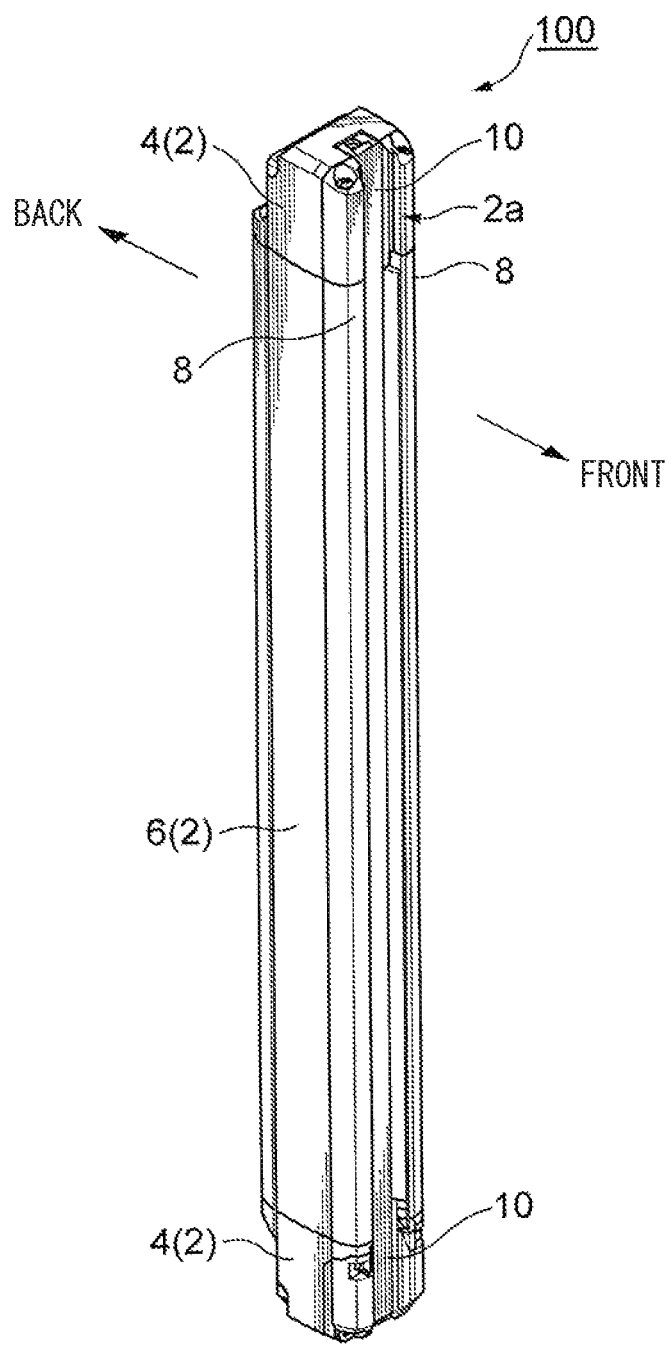
FIG. 1 is a perspective view of a multiple optical-axis photoelectric sensor of a first embodiment.
Figure 2:
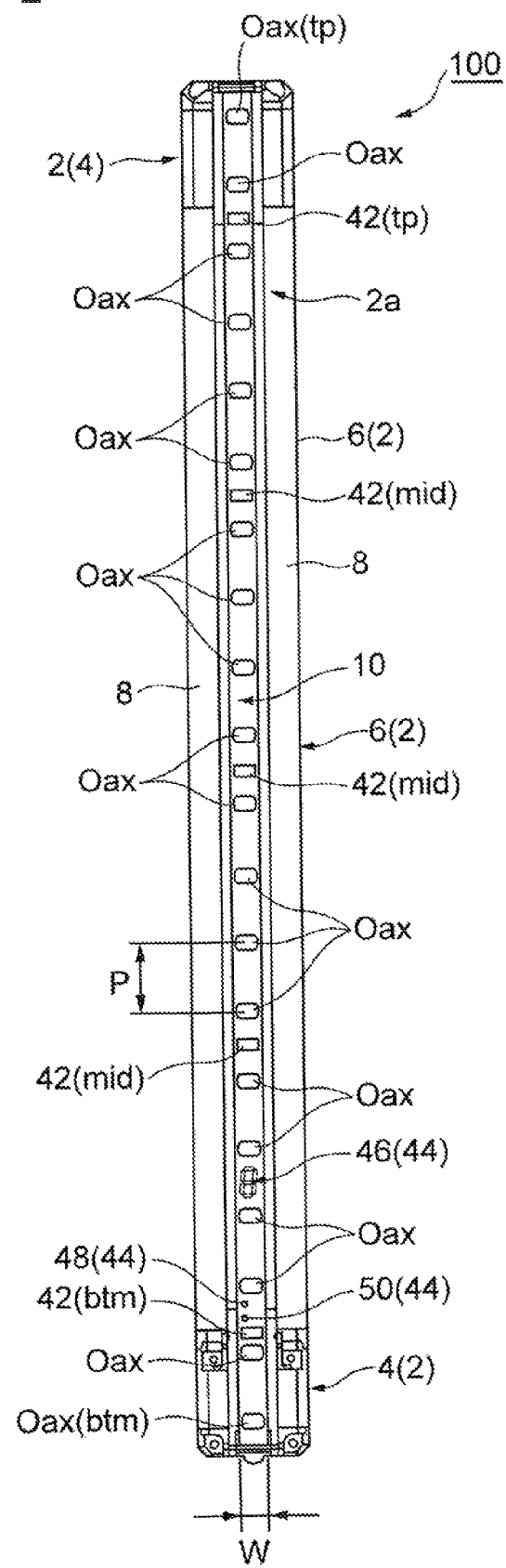
FIG. 2 is a front view of the multiple optical-axis photoelectric sensor (receiver) of the first embodiment illustrated in FIG. 1.
Figure 3:
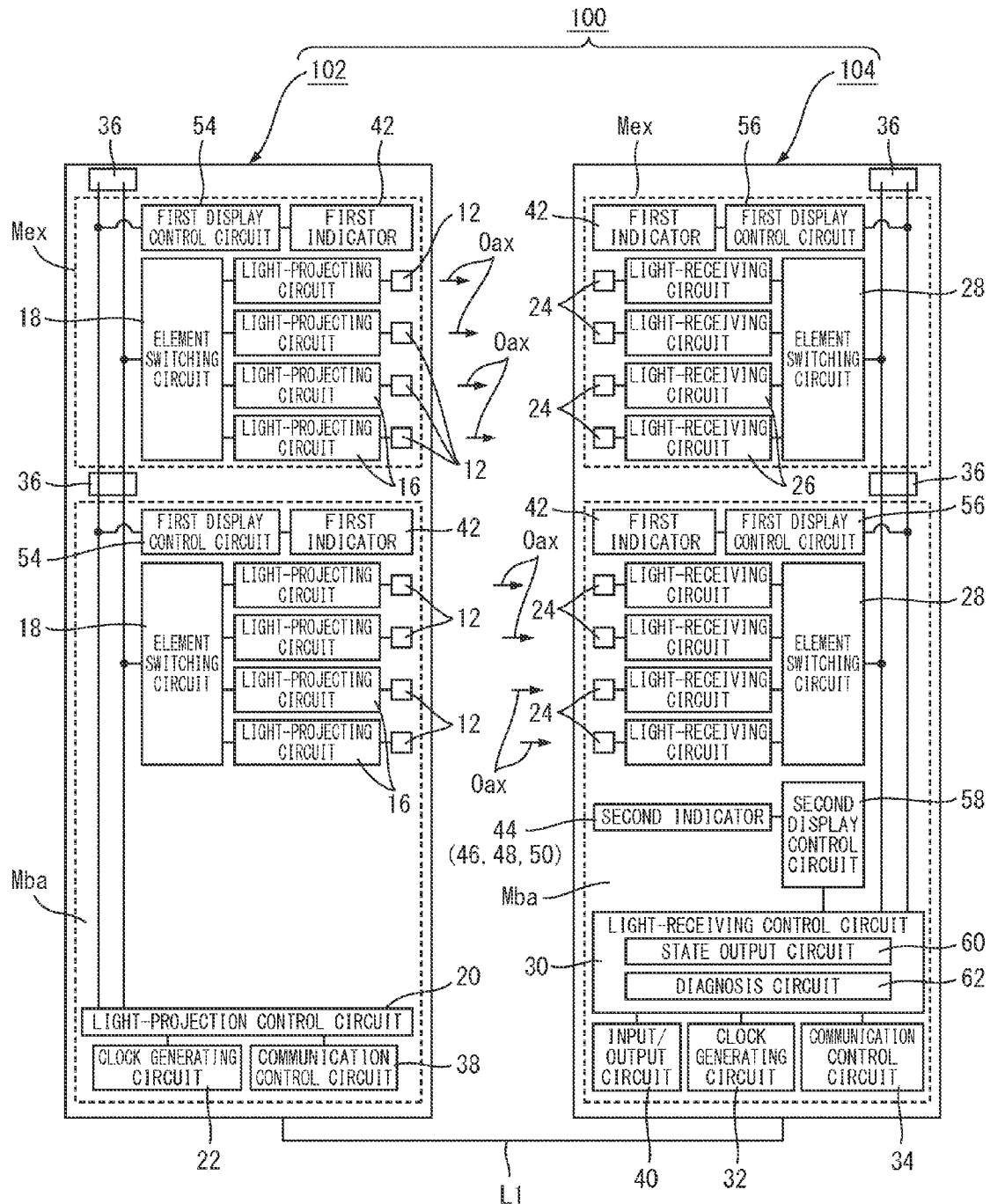
FIG. 3 is a block diagram of a transmitter and a receiver which constitute the multiple optical-axis photoelectric sensor of the first embodiment.

Embodiments
First Embodiment (FIGS. 1 to 23):

FIGS. 1 to 3 illustrate a multiple optical-axis photoelectric sensor 100 of a first embodiment. FIG. 1 is a perspective view of the multiple optical-axis photoelectric sensor 100, and FIG. 2 is a front view of the multiple optical-axis photoelectric sensor 100. FIG. 3 is a block diagram of a pair of a transmitter 102 and a receiver 104 which constitute the multiple optical-axis photoelectric sensor 100. As is known, the transmitter 102 and the receiver 104 mutually have the same number of plural optical axes, and with respect to each optical axis, an optical beam is transmitted from the transmitter 102 toward the receiver 104 in a time-shared manner, to thereby form a light curtain. In FIG. 3, reference symbol Oax denotes an optical axis.

Although the multiple optical-axis photoelectric sensor 100 of the first embodiment is configured by a pair unit of the transmitter 102 and the receiver 104, as a modified example, it may be a multiple optical-axis photoelectric sensor described later as a second embodiment having such a form that one unit is longitudinally divided into two to constitute single units, i.e., one half section is regarded as a light-projecting section while the other half section is regarded as a light-receiving section, a set of these units is prepared, and optical beams emitted from a light-projecting section as the one unit are received in a light-receiving section as the other unit.

Referring to FIGS. 1 and 2, a narrow case 2 for the multiple optical-axis photoelectric sensor 100 of the first embodiment is made up of terminal cases 4 constituting one end and the other end, and a middle case 6 located between these two terminal cases 4, 4. The terminal case 4 is a molded article made of a synthetic resin or metal. On the other hand, the middle case 6 is an extrusion molded article, and changing a length of the middle case 6 leads to production of a plurality of types of multiple optical-axis photoelectric sensors 100 having the terminal cases 4 in common and having different length dimensions.

Referring to FIG. 1, a pair of hard projections 8, 8 is formed preferably on both sides of the detection surface located on a front surface 2a of the case 2 for the multiple optical-axis photoelectric sensor 100, namely on both sides of the light-projecting surface from which optical beams are emitted in the transmitter 102 and on both sides of the light-receiving surface on which optical beams are received in the receiver 104. Specifically, in the case 2 for the multiple optical-axis photoelectric sensor 100, the pair of longitudinally extending projections 8, 8 is formed on both sides of the front surface 2a of the case 2, a light transmissive protecting cover 10 which longitudinally extends from one end toward the other end is disposed on an across-the-width middle region sandwiched between the pair of projections 8, 8, and this light transmissive protecting cover 10 constitutes the detection surface. That is, the light transmissive protecting cover 10 constituting the detection surface of the multiple optical-axis photoelectric sensor 100 is disposed in a gap with a small width sandwiched between the hard projections 8, 8 located on both sides of the cover 10 and protruding forward. Thus, even when a bar collides with the front surface 2a of the case 2, for example, an impact of this bar is received by these pair of projections 8, 8, thereby allowing protection of the light transmissive protecting cover (detection surface) 10 from damage. The longitudinally extending light transmissive protecting cover (detection surface) 10 for the multiple optical-axis photoelectric sensor 100 has a width W of 9 mm. As a modified example, there may be provided a multiple optical-axis photoelectric sensor without a pair of projections 8, 8.

As described above, the multiple optical-axis photoelectric sensor provided with a pair of projections has already been disclosed in Japanese Unexamined Patent Publication No. 2009-10817, which has already been proposed by the present applicant, and the present applicant has been selling products obtained by implementation thereof. When this pair of projections is referred to as a "twin-bumper structure", a spacing between the pair of projections adopted in the known multiple optical-axis photoelectric sensor provided with the twin-bumper structure is larger than 9 mm. That is, a width dimension of the detection surface of the multiple optical-axis photoelectric sensor provided with the existing twin-bumper structure is far larger than a width dimension W (W=9 mm) of the detection surface 10 of the multiple optical-axis photoelectric sensor 100 of the embodiment.

FIG. 3 is a block diagram of a transmitter 102 and a receiver 104 which make a pair. The transmitter 102 and the receiver 104 in the pair are connected to each other via a communication line or a signal line L1, or by air. Further, the transmitter 102 and the receiver 104 can each be extended in series via the communication line or the signal line.

In the transmitter 102, N light-projecting elements 12 are arranged in a row at regular intervals, and the N light-projecting elements 12 are, for example, configured by light-emitting diodes that emit infrared rays. The number of light-projecting elements 12 can be extended by serial coupling of a circuit board mounted with the elements. The transmitter 102 has N light-projecting circuits 16 for individually driving the N light-projecting elements 12, an element switching circuit 18 for scanning these N light-projecting circuits 16 in a time-shared manner, and a light-projection control circuit 20 for totally controlling the transmitter 102. The light-projection control circuit 20 generates light-projection timing of sequentially making the N light-projecting elements 12 emit light upon receipt of a clock signal from a clock generating circuit 22.

On the other hand, in the receiver 104, N light-receiving elements 24 are arranged in a row at regular intervals, and these N light-receiving elements 24 are, for example, configured by photo diodes that receive infrared rays. A pitch P (FIG. 2) between each of these N light-receiving elements 24, 24 is the same as that between each of the light-projecting elements 12. The number of light-receiving elements 24 can be extended by serial coupling of a circuit board installed with the elements. The receiver 104 has N light-receiving circuits 26 for individually driving the N light-receiving elements 24, an element switching circuit 28 for scanning the N light-receiving circuits 26 in a time-shared manner, and a light-reception control circuit 30 for totally controlling the receiver 104, and the light-reception control circuit 30 sequentially activates the N light-receiving elements 24 upon receipt of a clock signal from a clock generating circuit 32. Further, the transmitter 102 includes a communication control circuit 38 that controls communication with the receiver 104, such as transmission/reception of a timing signal.

In the multiple optical-axis photoelectric sensor 100, when a command from the receiver 104 is received, the light-projection control circuit 20 of the transmitter 102 sequentially activates the N light-projecting circuits 16. Thereby, the transmitter 102 sequentially lights the light-projecting elements 12 from the first one to the N-th one.

The receiver 104 controls communication with the transmitter 102, such as transmission/reception of a timing signal, by the communication control circuit 34. Upon receipt of the timing signal from the transmitter 102, the light-reception control circuit 30 sequentially activates the light-receiving elements 24 from the first one to the N-th one, and takes in outputs from the light-receiving elements 24 which correspond to optical beams emitted in sequence from the transmitter 102.

Inner structures of the transmitter 102 and the receiver 104 have been modularized, and an extension module Mex can be connector-coupled with a basic module Mba as necessary, to thereby increase the optical axes. Reference numeral 36 of FIG. 3 denotes a connector.

In addition to the light-projection control circuit 20 and the clock generating circuit 22 of the transmitter 102, a communication control circuit denoted by reference numeral 38 in FIG. 3 is mounted on a transmitter basic module Mba. On the other hand, in addition to the light-reception control circuit 30, the clock generating circuit 32, and the communication control circuit 34 of the receiver 104, an input/output circuit denoted by reference numeral 40 in FIG. 3 is mounted on a receiver basic module Mba.

In FIG. 2 which is the front view of the multiple optical-axis photoelectric sensor 100, an optical axis is denoted by reference symbol Oax, which substantially represents the light-projecting element 12 when being in the transmitter 102 and substantially represents the light-receiving element 24 when being in the receiver 104. In the case 2 for the multiple optical-axis photoelectric sensor 100, the optical axes Oax are arranged not only in the middle case 6 but also in the terminal case 4, and are thereby arranged longitudinally at regular intervals over the entire area of the multiple optical-axis photoelectric sensor 100 from one end toward the other end thereof. An inter-optical-axis pitch P of the illustrated multiple optical-axis photoelectric sensor 100 is 20 mm.

Subsequently, referring to FIG. 2, reference numeral 42 denotes a first indicator. A plurality of first indicators 42 are arrayed at intervals in a row in the longitudinal direction of the multiple optical-axis photoelectric sensor 100 (transmitter 102 and receiver 104), and arranged adjacent to the optical axes Oax. In this embodiment, the number of first indicators 42 is "5". The arraying direction of the plurality of first indicators 42 is the longitudinal direction of the multiple optical-axis photoelectric sensor 100, which is the same as the arraying direction of the plurality of optical axes Oax. As illustrated, the row of the first indicators 42 is preferably arranged on the same axis as the row of the optical axes Oax. That is, in a preferred embodiment, as illustrated in FIG. 2, the row of the optical axes Oax and the row of the first indicators 42 are arranged on the same straight line, and each of the first indicators 42 is positioned in a region sandwiched between the adjacent optical axes Oax so as not to interfere with the optical axes Oax. When the first indicator 42 is referred to as a "center indicator lamp", the center indicator lamp 42 is used for making the presence of the multiple optical-axis photoelectric sensor 100 clear at the time of operation, and the like. An application example of the first indicator (center indicator lamp) 42 will be described later.

Figure 4:
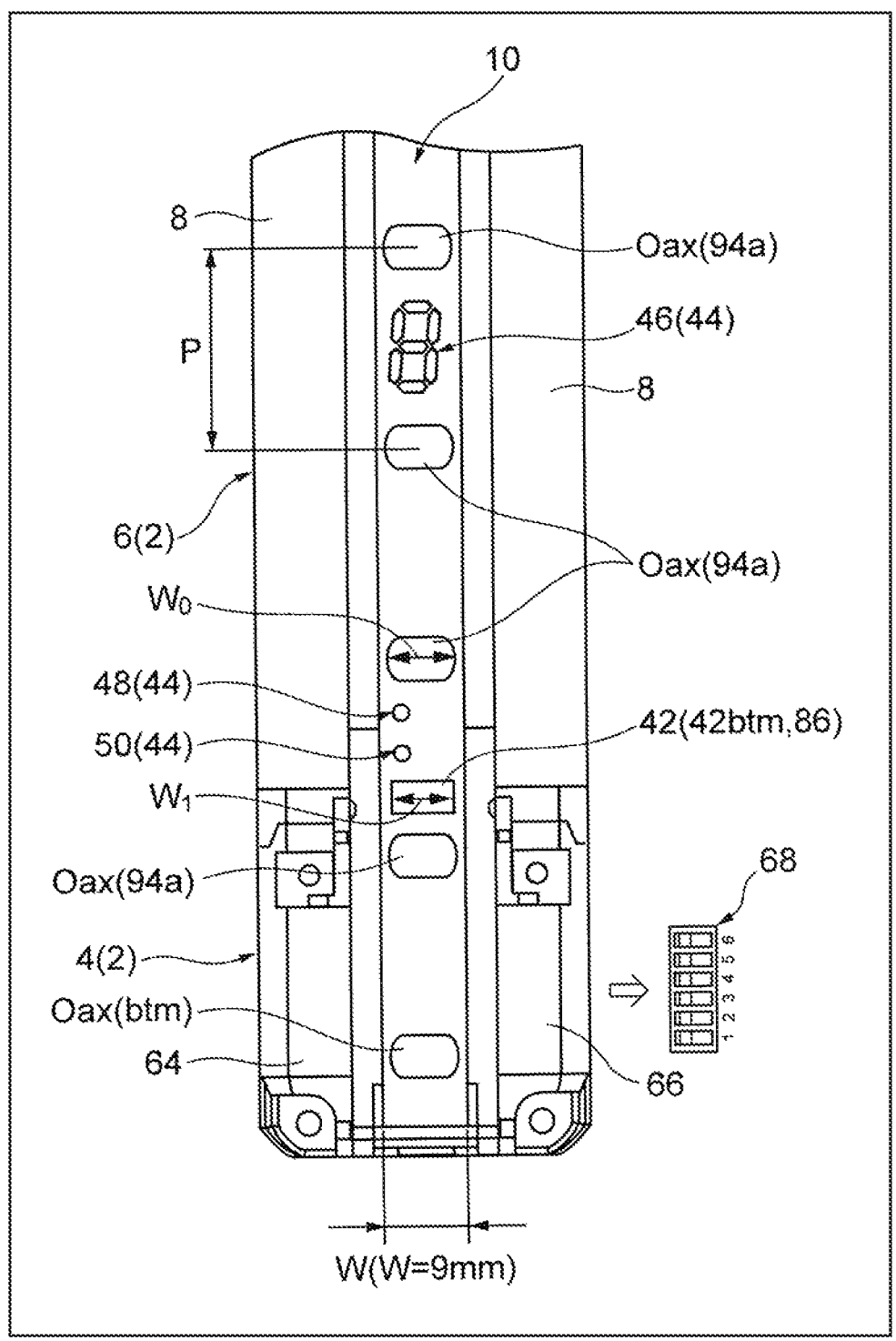
FIG. 4 is an enlarged view of a lower end of the longitudinally-disposed multiple optical-axis photoelectric sensor (receiver) illustrated in FIG. 2.

A second indicator 44 is provided at the end of at least the receiver 104, where the receiver basic module Mba is installed, in the multiple optical-axis photoelectric sensor 100. FIG. 4 is an enlarged view of the lower end portion of the multiple optical-axis photoelectric sensor 100 (receiver 104) illustrated in FIG. 2. Referring to FIG. 4 as the enlarged view, the second indicator 44 includes a 7-segment indicator (7-segment LED) 46, an OSSD indicator 48, and an interlock indicator 50.

The 7-segment LED 46 is arranged between the two adjacent optical axes Oax, Oax so as not to interfere with the optical axis Oax located in the lower end portion of the receiver 104. Although the multiple optical-axis photoelectric sensor 100 of the embodiment has adopted the 1-digit 7-segment LED 46, a plural-digit 7-segment LED 46 may also be adopted. The 7-segment LED 46 is mounted on a circuit board of the receiver basic module Mba so as to perform a display with the arraying direction of the optical axes Oax turned vertical. That is, when the receiver 104 is longitudinally installed with its longitudinal direction turned vertical, the 7-segment LED 46 is mounted on the circuit board of the receiver basic module Mba such that the installed position of the receiver 104 agrees with the top and bottom of a numerical figure. A display example of the 7-segment indicator (7-segment LED) 46 will be described later.

The OSSD indicator 48 and the interlock indicator 50 are arranged alongside in the low direction of the optical axes Oax, and arranged as being offset laterally from the center line of the row of the optical axes Oax, so as not to interfere with the optical axes Oax in a place between the first indicator 42 located in the lower end portion of the receiver 104 and the optical axis Oax adjacent thereto. That is, the OSSD indicator 48 and the interlock indicator 50 are both mounted on the receiver basic module Mba. The OSSD indicator 48 displays an output state of a safe control signal for permitting or not permitting an operation of a hazardous source (e.g., press machine). The interlock indicator 50 performs an orange lighting display of an OFF-state of the OSSD output due to interlock. Further, in the case of an interlock releasable state, the indicator performs an orange blinking display. When the interlock indicator 50 performs an orange blinking display, that is, when the multiple optical-axis photoelectric sensor 100 accepts a reset input in the interlock releasable state, the interlock state is released and the sensor shifts to a normal operation.

Returning to the block diagram of FIG. 3, in the transmitter 102, a first display control circuit 54 for controlling the first indicator 42 is mounted on each of the basic module Mba and the extension module Mex.

In the receiver 104, a first display control circuit 56 for controlling the first indicator 42 is mounted on each of the basic module Mba and the extension module Mex. Further, the basic module Mba of the receiver 104 is mounted with a second display control circuit 58 for controlling the second indicator 44 (7-segment indicator 46, OSSD indicator 48, interlock indicator 50). In the transmitter 102, a power indicator and a muting indicator may be provided in a portion corresponding to the OSSD indicator 48 and the interlock indicator 50 of the receiver 104.

The basic module Mba of the receiver 104 is further mounted with a diagnosis circuit 62 for diagnosing failures of the light-projecting circuit 16, the light-receiving circuits 26, and a state output circuit 60. The diagnosis circuit 62 transmits, to the input/output circuit 40, presence or absence of the failures of the light-projecting circuit 16, the light-receiving circuits 26, and the state output circuit 60.

The multiple optical-axis photoelectric sensor 100 includes: (1) a muting function of making a detection function of part or all of the optical axes Oax temporarily inactive; (2) a blanking function of preventing an operation of a hazardous source (e.g., press machine) from being suspended due to the presence of a fixed article (obstacle) that interferes with the detection region of the multiple optical-axis photoelectric sensor 100 in the case of presence of this interfering article; and (3) a reduced resolution function of making a light-interception determination for the first time when a predetermined number of two or more of the optical axes Oax are intercepted, to thereby increase a size of the minimum detected object of the multiple optical-axis photoelectric sensor 100.

Referring to FIG. 4 again, in the terminal case 4 at the lower end of the multiple optical-axis photoelectric sensor 100 (receiver 104) seen in FIG. 4, opening/closing lids 64, 66 are provided in portions of the right and left projections 8 sandwiching the light-receiving surface 10, and by opening the opening/closing lid 64 on the left-hand side, an IFU connector (not illustrated) can be exposed. On the other hand, by opening the opening/closing lid 66 on the right-hand side, a manual-type setting switch group 68 can be exposed. FIG. 5 illustrates a setting switch 70 for the center indicator lamp 42 which is included in the setting switch group 68. In an OFF-state illustrated on the left-hand side of FIG. 5, "center green display OFF" is set in which the center indicator lamp (first indicator) 42 does not perform a green display. This allows reduction in power consumption associated with green lighting of the center indicator lamp (first indicator) 42. On the other hand, in an ON-state illustrated on the right-hand side of FIG. 5, "center green display ON" is set in which green lighting of the center indicator lamp 42 is activated.

In the multiple optical-axis photoelectric sensor 100 of the embodiment, a plurality of light-projection cycles and/or light-projection timing (phases) are previously prepared as a function to prevent mutual interference with the multiple optical-axis photoelectric sensors of the same design, and a switch included in the setting switch group 68 is turned ON and OFF, to thereby allow setting of desired light-projection cycle and/or light-projection timing (phase).

Herein, making at least the light-projection cycle changeable by the manual switch eliminates the need for dynamically changing the light-projection timing (phase) in accordance with a light-receiving state in order to prevent mutual interference with the other multiple optical-axis photoelectric sensor. Hence it is convenient to be able to make a selection out of a plurality of light-projection cycles by the manual switch when the transmitter 102 and the receiver 104 of the multiple optical-axis photoelectric sensor 100 are synchronized not by the communication line or the signal line L1 (FIG. 3), but by air or optical beams. Further, the setting switch group 68 includes a switch for turning ON or OFF the reduced resolution function described above.

As for the plurality of light-projection cycles and/or the plurality of light-projection timings (phases), for example, the following four light-projection patterns are preferably prepared.

(1) First Light-Projecting Pattern:

In the case of "wireless synchronization (optical synchronization)", as the same light-projection pattern as "wired synchronization", pulsed light made up of two pulses each with a pulse width of 1 us at a pulse interval of 10 us is sequentially projected with respect to each optical axis Oax, from the first optical axis Oax to the final optical axis Oax. This first light-projection pattern is a light-projection pattern excellent in responsiveness as compared with second to fourth light-projection patterns which will be described below.

(2) Second Light-Projection Pattern:

In the case of the "wireless synchronization (optical synchronization), pulsed light with a larger number of pulses with respect to each optical axis Oax than in the "wired synchronization", e.g., pulsed light made up of three pulses each with a pulse width of 1 us at a pulse interval of 10 us is sequentially projected with respect to each optical axis Oax, from the first optical axis Oax to the final optical axis Oax. Making the number of pulses different from that of the first light-projection pattern makes the light-projection cycle (1-scan cycle) different from that of the first light-projection pattern, to thereby shift the phase of light-projection. This can prevent interference between the multiple optical-axis photoelectric sensor with the first light-projection pattern having been selected and the multiple optical-axis photoelectric sensor with the second light-projection pattern having been selected.

(3) Third Light-Projection Pattern:

A third light-projection pattern is set such that pulse patterns of one or a plurality of optical axes Oax for synchronization are made significantly different. For example, in the case of the "wireless synchronization (optical synchronization)", although light projection may be performed in the same pattern as that of the "wired synchronization", a different light-projection pattern may be adopted. When the third light-projection pattern is described by illustrating the case of making a light curtain by use of a pair of the transmitter 102 and the receiver 104 in the multiple optical-axis photoelectric sensor 100 illustrated in FIGS. 1 and 2, as for a middle optical axis Oax (mid) (FIG. 2), pulsed light made up of three pulses each with a pulse width of 1 us at a pulse interval of 20 us is sequentially projected from the second optical axis Oax to the optical axis Oax (mid) one before the final optical axis Oax. As for a first optical axis Oax (btm) and a final optical axis Oax (tp) (FIG. 2) for both detection and synchronization, for example, light is made up of four pulses each with a pulse width of 1 us at a pulse interval of 35 us.

In this case, as for the light-projection interval between each optical axis Oax, the interval between the middle optical axes Oax (mid) is set to 90 us, and the interval between the first optical axis Oax (btm) and the final optical axis Oax (tp) is set to 265 us. It is to be noted that part or all of the pulse intervals of the first optical axis Oax (btm) and the final optical axis Oax (tp) may be made different, or the pulse width of the first optical axis Oax (btm) and the final optical axis Oax (tp) and the pulse width of the middle optical axis Oax (mid) may be made different.

(4) Fourth Light-Projecting Pattern:

As a fourth light-projection pattern, as for the middle optical axis Oax (mid) (FIG. 2) only for detection, pulsed light made up of three pulses each with a pulse width of 1 us at a pulse interval of 15 us is sequentially projected at each of the optical axis Oax, from the second optical axis Oax to the optical axis Oax (mid) one before the final optical axis Oax. As for the first optical axis Oax (btm) and the final optical axis Oax (tp) (FIG. 2) for both detection and synchronization, pulsed light is made up of four pulses each with a pulse width of 1 us at a pulse interval of 50 us (35 us in the third light-projection pattern).

In the fourth light-projection pattern, as for the light-projection interval between each optical axis Oax, the interval between the middle optical axes Oax (mid) only for detection is 90 us as in the third light-projection pattern, but the interval between the first optical axis Oax (btm) and the final optical axis Oax (tp) for both detection and synchronization is set to 300 us which is different from that in the third light-projection pattern. It is to be noted that part or all of the pulse intervals of the first optical axis Oax (btm) and the final optical axis Oax (tp) may be made different, or the pulse width of the first optical axis Oax (btm) and the final optical axis Oax (tp) and the pulse width of the middle optical axis Oax (mid) may be made different.

As described above, preparing pulse patterns with different pulse cycles of the respective optical axes Oax can prevent interference with optical beams by another transmitter 102 of the same design. The light-projection pattern may be selected by a logic or DIP switch of an input line, or may be selected by a setting unit such as an external PC connected to the multiple optical-axis photoelectric sensor 100.

Hereinafter, applied examples of the first indicator (center indicator lamp) 42 and the second indicator 44 will be exemplarily described.

Self-Diagnosis of Multiple Optical-Axis Photoelectric Sensor 100:

Various failure diagnoses are executed at the time of light-projection scanning processing on the multiple optical-axis photoelectric sensor 100. Then, as a result of the diagnoses, when it is determined as safe, a safe output (OSSD) is ON, and a display of the multiple optical-axis photoelectric sensor 100 in operation is continued. On the other hand, as a result of the diagnoses, when it cannot be determined as safe, the multiple optical-axis photoelectric sensor 100 enters a lockout state, and the safe output (OSSD) is turned OFF. Referring to FIG. 3, the failure diagnosis is performed by cooperation of the diagnosis circuit 62 and the light-reception controlling section 30, and when a failure is determined, the input/output circuit 40 is controlled. In the example illustrated in FIG. 3, the diagnosis circuit 62 is provided in the receiver 104 and a diagnosis circuit is not provided in the transmitter 102, but there may be adopted a configuration where the diagnosis circuit 62 and a control circuit that cooperates with this diagnosis circuit 62 are also provided in the transmitter 102 as in the receiver 104, and the diagnosis result is supplied from the control section of the transmitter 102 to the receiver 104. For displaying the diagnosis result, the first indicator (center indicator lamp) 42 is lighted in a predetermined pattern (including a code) based on a diagnosis signal. For example, when the input/output circuit 40 receives a signal of diagnosis that any of the light-projecting circuit 16, the light-receiving circuits 26, and the state output circuit 60 has failed, all the first indicators (center indicator lamps) 42 are blinked in red. In addition, the 7-segment indicator (7-segment LED) 46 included in the second indicator 44 may be made to perform a display representing the failure. The display of the diagnosis result will be described later.

During Operation of Multiple Optical-Axis Photoelectric Sensor 100:

During an operation mode of the multiple optical-axis photoelectric sensor 100 to perform detection of an object by light interception of the optical axes Oax, the first indicator (center indicator lamp) 42 operates in a predetermined pattern.

When all the optical axes Oax are in a light entrance state, all the first indicators (center indicator lamps) 42 are lighted in green. This can facilitate visual checking of the presence of the light curtain, so as to obviate inadvertent entry into a hazardous region. Further, by lighting all the center indicator lamps 42 in green when all the optical axes Oax match at the time of optical-axis adjustment, it is possible to provide the user with information that the optical-axis adjustment has been completed, as optical-axis adjustment support information.

For example, when one or a plurality of optical axes Oax are light-intercepted, all the first indicators (center indicator lamps) 42 may be extinguished, or lighted or blinked in red, or the first indicator (center indicator lamp) 42 mounted in the module Mba or Mex to which the light-intercepted optical axis Oax belongs may be lighted or blinked in red while the first indicator (center indicator lamp) 42 in the other module Mex or Mba may be extinguished. As described above, in a limited manner to the module Mba or Mex to which the light-intercepted optical axis Oax belongs, the first indicator (center indicator lamp) 42 in which an LED mounted on the module Mba or Mex is used as a light source is lighted or blinked in red, thereby making it possible to facilitate specification of a site where light interception has occurred.

Referring to FIG. 2, although five first indicators (center indicator lamps) 42 are arranged at regular intervals in the illustrated multiple optical-axis photoelectric sensor 100, the indicators may be sectioned to the top center indicator lamp 42 (tp), the bottom center indicator lamp 42 (btm), and the three center indicator lamps 42 (mid) located in the middle, and lighting control may be performed in the following pattern. In this case, the number of center indicator lamps 42 may be three, for example.

(1) Extinguishing of Center Indicator Lamp (First Indicator) 42

(1-1) When the optical axis Oax (tp) located at the top is light-intercepted, the center indicator lamp 42 (tp) located at the top is extinguished and the center indicator lamps 42 (mid) located in the middle are extinguished.

(1-2) When the optical axis Oax (btm) located at the bottom is light-intercepted, the center indicator lamp 42 (btm) located at the bottom is extinguished and the center indicator lamps 42 (mid) located in the middle are extinguished.

(2) Red Lighting of Center Indicator Lamp (First Indicator) 42:

When the optical axes Oax (tp) located at the top and the bottom are in a light entrance state and at least one of the optical axes Oax located in the middle is light-intercepted, all the center indicator lamps (first indicators) 42 are lighted in red.

(3) Green Lighting of Center Indicator Lamp (First Indicator) 42:

When all the optical axes Oax are in the light entrance state, all the center indicator lamps (first indicators) 42 are lighted in green.

(4) Red Blinking of Center Indicator Lamp (First Indicator) 42:

When all the optical axes Oax are in a lockout state, all the center indicator lamps (first indicators) 42 are blinked in red.

Performing the above lighting control of the first indicators (center indicator lamps) 42 allows matching of optical axes while viewing the first indicators (center indicator lamps) 42 at the time of performing relative positioning of the transmitter 102 and the receiver 104 in the multiple optical-axis photoelectric sensor 100. Thus, the operability of the relative positioning operation for the transmitter 102 and the receiver 104, namely, optical-axis adjustment can be enhanced.

Each optical axis Oax may not be in the light entrance state by a wide margin even when it is determined as being in the light entrance state. As factors of this, for example, displacement of the optical axis Oax, contamination of the protection cover (front cover) and the like are considered. Precisely transmitting a margin degree to a viewer can facilitate optical-axis adjustment, or can promote optical-axis readjustment, cleaning of the protection cover (front cover), and the like.

As described above, whichever light-projection pattern is selected out of the first to fourth light-projection patterns, the transmitter 102 projects light of plural pulses with respect to each optical axis Oax. For example, in the case of projecting an optical beam of three pulses with respect to each optical axis Oax, the receiver 104 that receives this beam, for example, determines it as "light entrance" by detecting two or more pulses, and determines it as "stable light entrance" by detecting all pulses (three pulses) with respect to each optical axis Oax. Then, on all the first to fourth optical axes Oax, light entrance/light interception determinations are made, and on at least the optical axis Oax determined as the light entrance, a determination is made as to whether or not it is the "stable light entrance". When not less than two pulses are detected in every optical axis Oax, a safe output (OSSD output) is turned ON, and when less than two pulses are detected in any optical axis Oax, the safe output (OSSD output) is turned OFF. Then, when all pulses (three pulses) are detected in every optical axis Oax, a "stable light entrance display" may be performed as "being in a stable light entrance state", and when the optical axis Oax in which two pulses are detected is present, an "unstable light entrance display" may be performed as "being in an unstable light entrance state". The "stable light entrance display" and the "unstable light entrance display" can preferably be performed by use of the first indicator 42 (FIG. 2) of the multiple optical-axis photoelectric sensor 100. For example, the first indicator 42 may be lighted in green in the "stable light entrance display", and the first indicator 42 may be blinked in green in the "unstable light entrance display". The "stable light entrance display" and the "unstable light entrance display" can be performed by using the OSSD indicator 48 (44) of the multiple optical-axis photoelectric sensor in addition to, or in place of, the first indicator 42 (FIG. 2). For example, the OSSD indicator 48 (44) may be lighted in green in the "stable light entrance display", and the OSSD indicator 48 (44) may be blinked in green in the "unstable light entrance display".

A display example of the 7-segment indicator (7-segment LED) 46 will be described with reference to FIGS. 6 to 11.

FIG. 6 illustrates a display example of the time of startup of the multiple optical-axis photoelectric sensor 100. A display example illustrated on the leftmost side of FIG. 6 represents "wired synchronization" in which the transmitter 102 and the receiver 104 are connected through the communication line or the signal line L1 (FIG. 3). Three display examples illustrated on the right side thereto are display examples concerning "optical synchronization". Sequentially from left, a display example (FC0) represents "absence of a mutual interference preventing function", a middle display example (FCA) represents "presence of the mutual interference preventing function and a light-projection cycle A pattern", and a right display example (FCB) represents "presence of the mutual interference preventing function and a light-projection cycle B pattern". Herein, the "time of startup", for example, represents the time of power-on, and immediately after turning on the power of the multiple optical-axis photoelectric sensor 100, the display of FIG. 6 is performed for the order of two to three seconds in accordance with the synchronization method for the transmitter 102 and the receiver 104.

A display example "F" of FIG. 7 illustrates an example of a setting state of the safe special function out of state displays of the safe special function, and when the multiple optical-axis photoelectric sensor 100 is operated with a change in minimum detected object in a floating blanking function, a reduced resolution function, and the like, "F" is displayed by the 7-segment indicator (7-segment LED) 46. In a normal operating state without a change in minimum detected object, a display representing this state may be performed by the 7-segment indicator (7-segment LED) 46.

FIGS. 8 and 9 illustrate display examples at the time of the multiple optical-axis photoelectric sensor 100 being in the lockout state. In FIG. 8, a code "E2" at the top represents a connection error of the multiple optical-axis photoelectric sensor 100. Next code "E4" represents a setting switch error. "E5" therebelow represents a software configuration error. Next code "E7" represents an interlock error. Next code "E8" represents an external device error. Next code "E10" represents an error of the receiver 104. Next code "E12" represents an error of the transmitter 102. Next code "E14" represents an error of an OSSD 1 of the safe output. Next code "E15" represents an error of an OSSD 2 of the safe output. Next code "E17" represents an error of an OSSD current of the safe output. Next code "E18" represents that a sub transmitter and a sub receiver (not illustrated) which are extended in series are not properly connected. For example, when the number of optical axes of the sub transmitter and the number of optical axes of the sub receiver do not match, "E18" is displayed. A code "E20" at the bottom represents a communication error between the transmitter 102 and the receiver 104. In FIG. 9, "E24" at the top represents breaking (open failure) of a muting lamp connected to a muting lamp output line. "E25" on the second from the top of FIG. 9 represents that an overcurrent is flowing through the muting lamp. Next code "E27" represents a function error. Although a code "E4_" at the bottom of FIG. 9 is illustrated as "_" for the sake of convenience, a numerical figure such as "1", "2", or "3" is displayed in this portion "_". That is, various system errors are displayed by use of numerical figures larger than "40".

As described above, the 7-segment LED 46 included in the second indicator 44 mounted in the receiver 104 is a one-digit LED. In order to display the above display examples, such as the code "E4" and "E18", a 2-digit, or 3-digit 7-segment LED needs to be prepared. However, the detection surface 10 of the receiver 104 has a small width (9 mm) as described above, and if a plural-digit 7-segment LED 46 is installed in this limited width, a letter, a symbol, a numerical figure, and a character which can be displayed by this become small. In other words, the smaller number of digits of the 7-segment LED 46 is more favorable for displaying a letter, a symbol, and a numerical figure which are maximally large in the limited width, and based on this intention, the digit of the 7-segment indicator (7-segment LED) 46 has been limited to one digit in the receiver 104.

In the embodiment, for displaying an amount of information not displayable at once in the 1-digit 7-segment indicator 46, e.g., the code "E4", there has been adopted a time-series display method in which, sequentially from the left of the code, "E" is first displayed, "4" is then displayed, and thereafter, this is repeated a plurality of times. As for the time when "E18" as another code example is displayed, there has been adopted a time-series display method in which, sequentially from the left of the code, "E" is first displayed, "1" is then displayed, and "8" is then displayed, and thereafter, this is repeated a plurality of times. As a modified example, in addition to performing displays sequentially from the left of the code, there may be added a lighting pattern in which the first display is performed by lighting, the second display is performed by relatively fast blinking, and the third display is performed by relatively slow blinking. Further, a definition that the last digit is displayed by relatively slow blinking may be added and, for example in the case of displaying a combination of a letter or a symbol and/or a numerical figure in plural (e.g., two) number, the first display may be performed by lighting and the second (last) display as the last digit may be performed by relatively slow blinking. As another modified example, if each segment of the 7-segment LED 46 is provided with a light source of two or three colors, color-coding thereof may be added.

Moreover, as seen from the above example, when a combination of a letter or a symbol and/or a numerical figure in plural number is displayed, the combination has previously been defined so as to prevent successive displays of the same letters, symbols, numerical figures, or characters, such as "E11". It is thereby possible to avoid confusion associated with succession of the same letters, symbols, numerical figures, or characters.

FIG. 10 is a display example during a muting operation. A display illustrated at the top represents that an input from a first muting sensor as a control input is in an ON-state. A display illustrated therebelow represents that an input from a second muting sensor 2 as a control input is in the ON-state. A display illustrated therebelow represents that a muting function is non-active (has not been activated) although inputs from the first and second muting sensors 1, 2 are in the ON-state. Further, when the muting function is in operation, external six segments excluding the lateral segment in the middle of the 7-segment LED are sequentially lighted (display example illustrated on the second from the bottom of FIG. 10). Moreover, at the time of an override input as a control input being in the ON-state, when override conditions are not met, only the undermost segment is lighted, and when the override conditions are met, the override function comes into operation, and by use of the lower four segments, these segments are sequentially lighted (display example illustrated at the bottom of FIG. 10).

The muting function in the multiple optical-axis photoelectric sensor 100 accepts muting inputs as control inputs from the two muting sensors, the first and second muting sensors, of a photoelectric switch, for example, and when sequences of an input order, input time difference, and the like from the two first and second muting sensors are appropriate, the safe function of the light curtain is temporarily suspended, and during suspension of the safety function, the OSSD does not output an OFF signal even when the optical axis Oax of the light curtain is light-intercepted.

A display example "U" illustrated in FIG. 11 represents that a wait input is in the ON-state. In displays of the above error state, control input state, safe special function state, and the like by use of the 7-segment indicator 46, when combinations that can occur simultaneously are present, contents to be displayed by the 7-segment indicator 46 may be sequentially displayed by setting the following priority, for example.

(Priority 1) Display of error state.

(Priority 2) Display of power-on.
(Priority 3) Display of override input.
(Priority 4) Display of wait input.
(Priority 5) Display of muting input 2.
(Priority 6) Display of muting input 1.
(Priority 7) Display of reduced resolution function or fixed blanking function.

As in the above example, as the priority order, the display of the error state is preferably set above the displays of the control input state and the safe special function state.

Referring again to FIG. 4, it is as described above that at the lower end of the receiver 104, the OSSD indicator 48 and the interlock indicator 50, both provided with the LED light sources, are arranged alongside so as not to interfere with the optical axes Oax. Display patterns of the OSSD indicator 48 and the interlock indicator 50, when illustrated, are as follows.

(1) The OSSD indicator 48 displays the OSSD state by being lighted in red, being lighted in green, or being blinked. When the power of the receiver 104 is OFF, the OSSD indicator 48 is extinguished.

(1-1) Red-lighting of the OSSD indicator 48: representing that the OSSD as the safe output is in the OFF-state.

(1-2) Green-lighting of the OSSD indicator 48: representing that the OSSD as the safe output is in the ON-state.

(1-3) Green-blinking of the OSSD indicator 48: representing that an alert output is in the ON-state.

(2) The interlock indicator 50 displays the interlock state by being lighted in red, being blinked in yellow, or being extinguished.

(2-1) Yellow-lighting of the interlock indicator 50: representing the state being the interlock state.

(2-2) Yellow-blinking of the interlock indicator 50: representing that an interlock/reset wait output is in the ON-state.

(3-3) Extinguishing of the interlock indicator 50: representing the state being neither the interlock state nor the lockout state.

Although illustration of the exterior structure of the lower end of the transmitter 102 is omitted since it is the same as that in FIG. 4, when a power indicator and a muting indicator are provided at positions at the lower end of the transmitter 102 which correspond to the OSSD indicator 48 and the interlock indicator 50 at the lower end of the receiver 104, a display pattern as follows may be adopted while the indicators are lighted in colors different from those of the receiver 104. Illustration of the exterior structure of the lower end of the transmitter 102 is omitted since it is the same as that in FIG. 4.

(3) Power indicator:

The power indicator may be lighted in orange when the power is ON, and may be extinguished when the power is OFF.

(4) The muting indicator may also be lighted in orange, for example.

(4-1) Orange lighting of the muting indicator: representing that the muting function is active. It may be made to represent that the override function is active.

(4-2) Quick orange-blinking of the muting indicator: representing that the first muting input as the control input is in the ON-state.

(4-3) Slow orange-blinking of the muting indicator: representing that the second muting input as the control input is in the ON-state.

(4-4) Extinguishing of the muting indicator: representing that the first and second muting inputs for the control input are both in the OFF-state.

Figure 13:
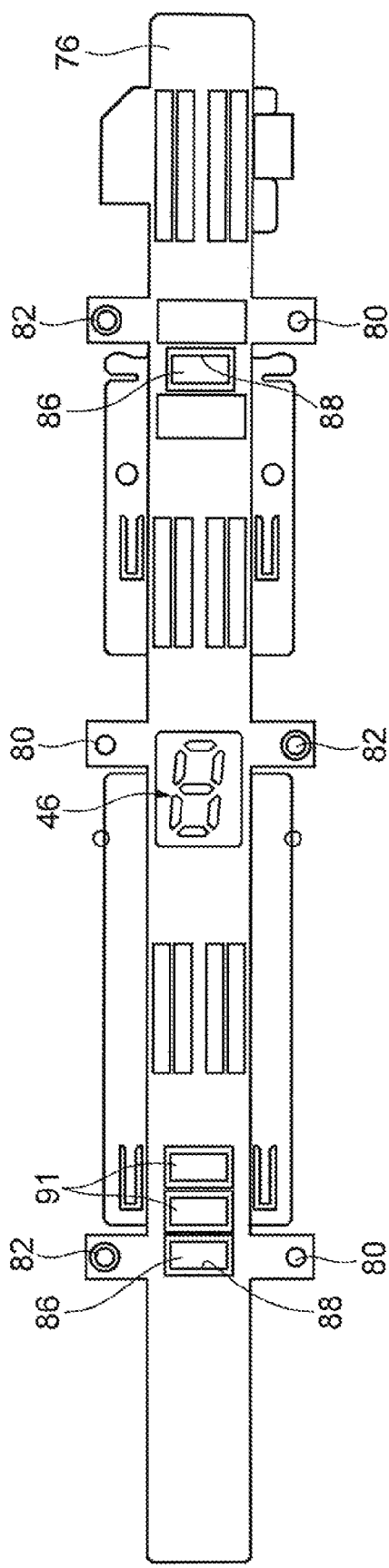
FIG. 13 is a view illustrating a holder to be positionally fixed to the circuit board.
Figure 14:
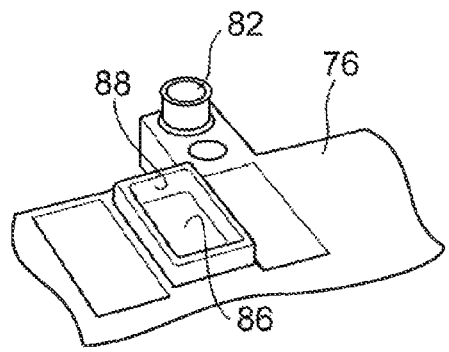
FIG. 14 is an extracted view of a portion of a cylinder included in the holder.

FIGS. 12 and 13 illustrate members constituting a module M to be incorporated into the case 2. FIG. 12 illustrates a circuit board 74, and FIG. 13 illustrates a holder 76 made of a synthetic resin. Referring to FIG. 12, it may be seen that three holes 78 are formed at each side of the circuit board 74 (a total of six holes 78). Meanwhile, referring to FIG. 13, the holder 76 has positioning pins 80 provided at each end of one side, and the two positioning pins 80 are provided on this one side. A cylinder 82 is provided in the middle portion of these two positioning pins 80, and the inner peripheral surface of the cylinder 82 has been screw-cut. FIG. 14 is an enlarged view of a portion of the cylinder 82.

Meanwhile, at the end of the other side of the holder 76, the cylinder 82 is provided at each end of one side, and this one side has a total of two cylinders 82, and is provided with the positioning pin 80 in the middle between these two cylinders 82. That is, the holder 76 has three positioning pins 80 arranged in a staggered form and three cylinders 82 also arranged in a staggered form, and the positioning pins 80 and the cylinders 82 are formed in positions corresponding to the total of six holes 78 in the circuit board 74.

The three positioning pins 80 arranged in the staggered form and the three cylinders 82 arranged in the staggered form in the holder 76 are respectively positioned in the corresponding holes 78 in the board 74, and three screws are then hinged to the three cylinders 82 from the rear surface of the board 74. Thus, the holder 76 and the board 74 are integrated and also relatively positioned.

Although FIGS. 12 to 14 exemplarily illustrate the integrated structure of the board 74 and the holder 76 concerning the extension module Mex, the same applies to the basic module Mba.

Figure 15:
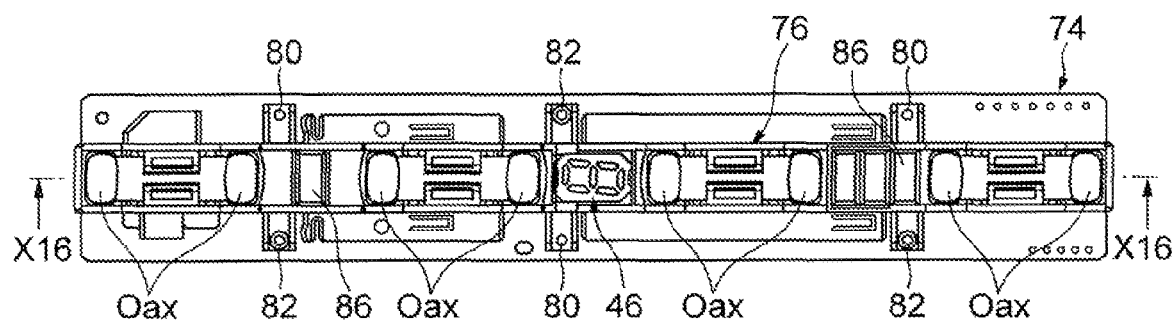
FIG. 15 is a view of an assembly (module) of the circuit board and the holder, seen from above.
Figure 16:
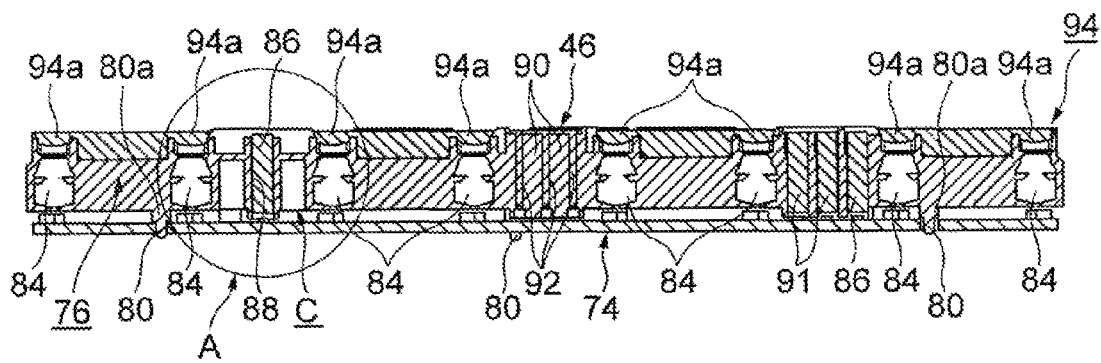
FIG. 16 is a sectional view taken along line X15-X15 of FIG. 15.

Although FIGS. 15 to 19 exemplarily illustrate the basic module Mba, the integrated structure of the board 74 and the holder 76 also applies to the extension module Mex, as described above. FIG. 15 is a front view of the module Mba, and FIG. 16 is a sectional view of FIG. 15 taken along line X16-X16.

Referring to FIG. 16, a light guiding path 84 is formed in the holder 76 with respect to each optical axis Oax, and further, a first opening 88, which is a through hole and accepts a center indication light guiding member 86, is formed with respect to each LED light source (mounted on the board 74) of the first indicator (center indicator lamp) 42. In addition, as for the basic module Mba, a second opening 92, which is a through hole and accepts a segment light guiding member 90, is formed with respect to each segment of the 7-segment LED 46 mounted on the board 74. In FIG. 16, reference numeral 94 denotes an elongated lens member provided with a lens section 94a with respect to each optical axis Oax.

As can be best seen from FIG. 16, a gap C is provided between the holder 76 and the board 74, and this gap C is defined by engaging a step 80a of the positioning pin 80 with the board 74. That is, a reference surface is defined by the steps 80a of the three positioning pins 80 arranged in the staggered form in the holder 76.

Figure 17:
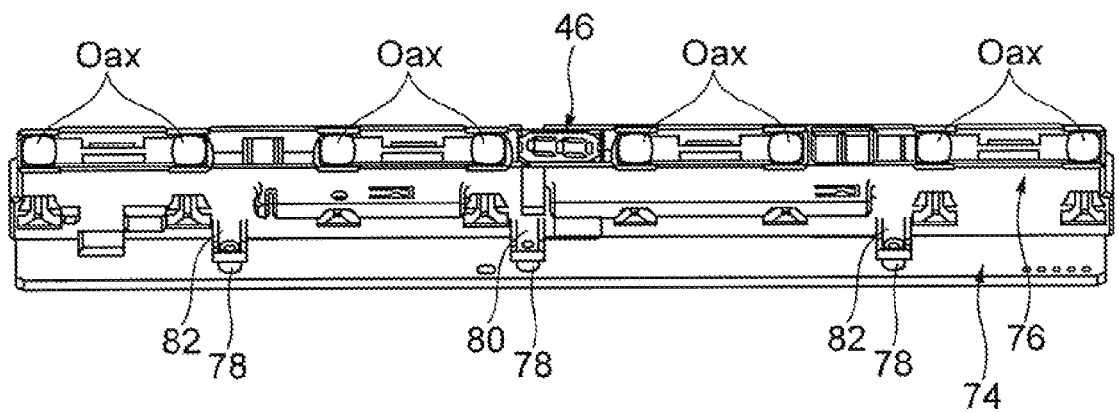
FIG. 17 is a perspective view of the assembly (module) of the circuit board and the holder, seen from one side.
Figure 18:
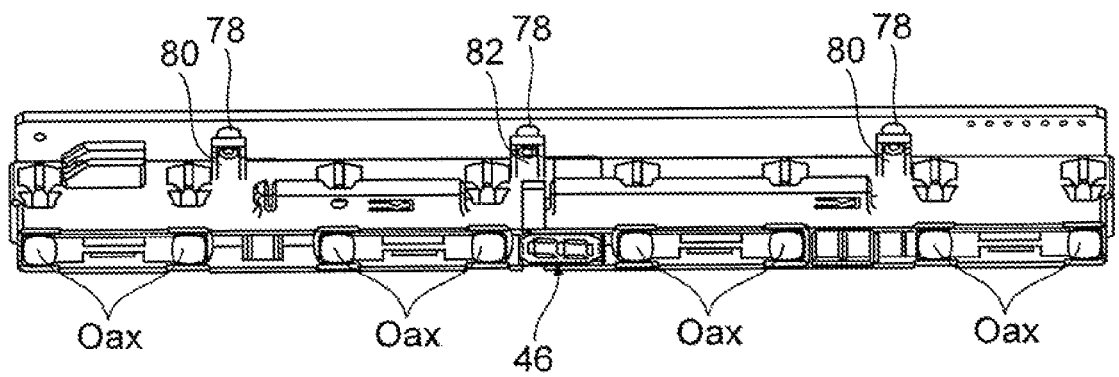
FIG. 18 is a perspective view of the assembly (module) of the circuit board and the holder, seen from the other side.

FIG. 17 is a perspective view of the module Mba as an assembly of the board 74 and the holder 76, seen from one side, and FIG. 18 is a perspective view of the module Mba illustrated in FIG. 17, seen from the other side.

Figure 20:
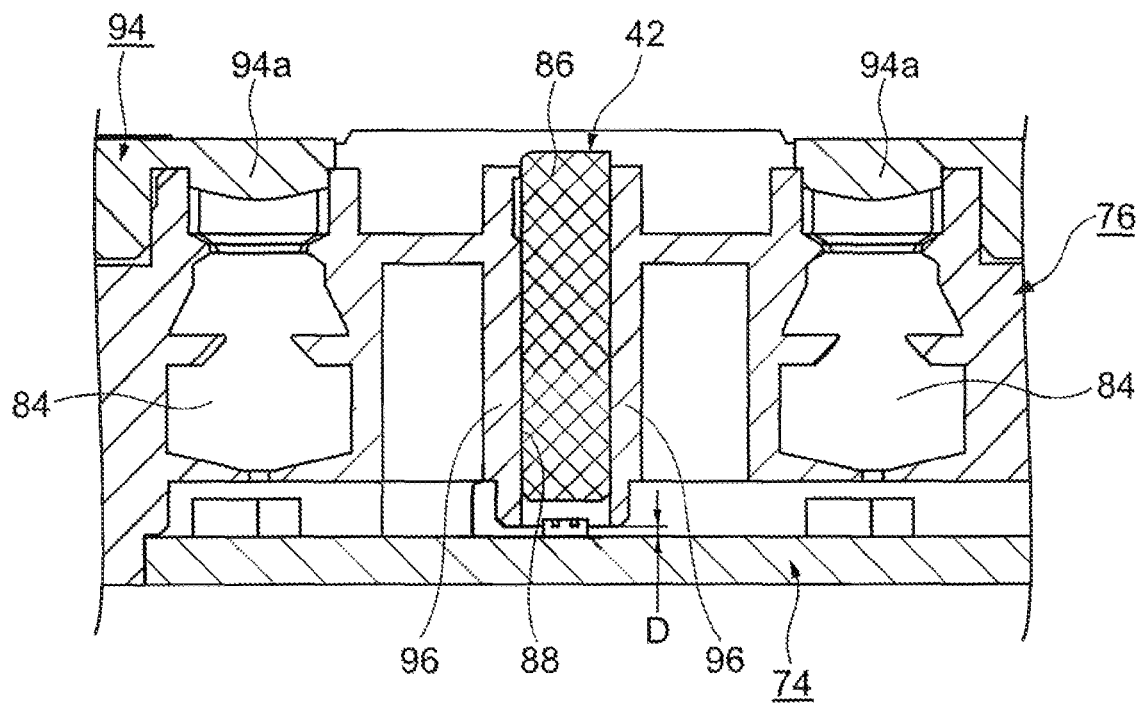
FIG. 20 is an enlarged sectional view of a main part obtained by extracting a portion of a center indication light guiding member and optical axes adjacent thereto.

FIG. 20 is a sectional view of a circled portion shown by an arrow A in FIG. 16. Referring to FIG. 20, it can be seen that the end of a wall 96 defining the first opening 88 that houses the center indication light guiding member 86 is spaced, although slightly, from the board 74 (reference symbol D). In FIG. 20, the spacing D has been set to 0.3 mm (D=0.3 mm) in terms of design in this embodiment. Providing the spacing D enables avoidance of a problem of the wall 96 and the board 74 interfering with each other, which occurs associated with a manufacturing error.

The center indication light guiding member 86 is formed of a synthetic resin material that can pass visible light therethrough. The center indication light guiding member 86 has the function of guiding visible light and the function of diffusing the light by reflecting it on the interface. As the most preferred embodiment, the center indication light guiding member 86 has been mixed with a material that absorbs an infrared ray. As a modified example, a film to cut off an infrared ray may be provided on the end surface of the center indication light guiding member 86. Specifically, the end surface of the center indication light guiding member 86 may be covered with an infrared-ray absorbing film, or coated with an infrared ray absorbing coating.

Although the center indication light guiding member 86 has been described above, the same applies to the segment light guiding member 90 associated with the 7-segment LED 46, and the segment light guiding member 90 is formed of a synthetic resin material that can pass visible light therethrough. This segment light guiding member 90 has the function of guiding visible light and the function of diffusing the light by reflecting it on the interface.

As the most preferred embodiment, the segment light guiding member 90 may also be mixed with the material that absorbs an infrared ray. As a modified example, the end surface of the segment light guiding member 90 may be covered with an infrared-ray absorbing film, or coated with an infrared ray absorbing coating. The same applies to a light guiding member 91 (FIG. 13) associated with the LED light sources of the OSSD indicator 48 and the interlock indicator 50 (mounted on the board 74).

Figure 19:
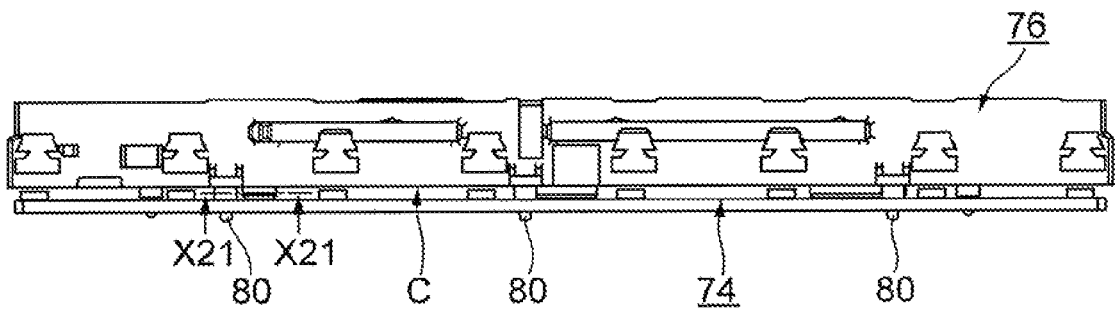
FIG. 19 is a side view of the assembly (module) of the circuit board and the holder.
Figure 21:
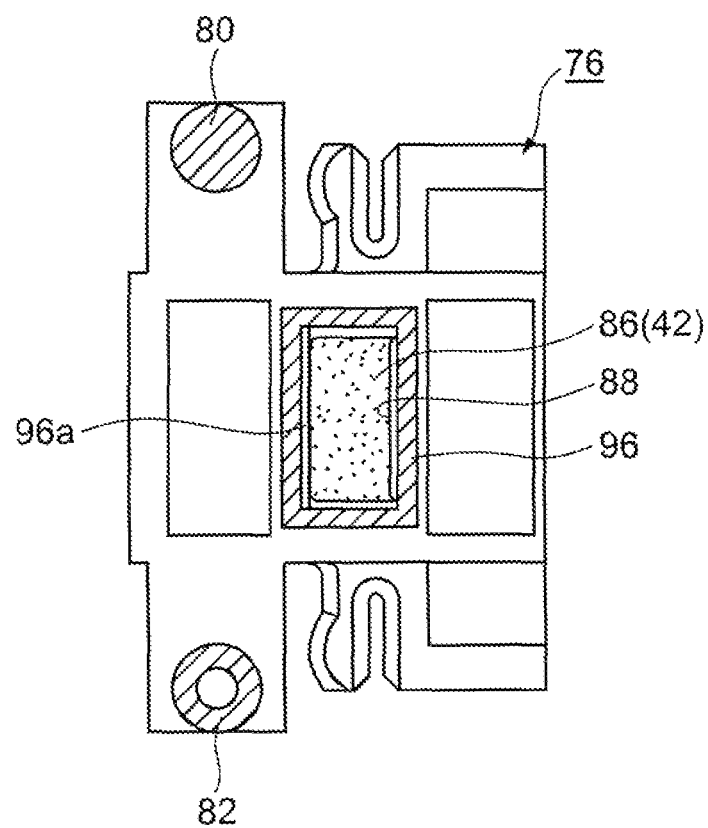
FIG. 21 is a sectional view taken along line X21-X21 of FIG. 19.

FIG. 21 is a view taken along line X21-X21 of FIG. 19. As can be best seen from FIG. 21, the center indication light guiding member 86 has a rectangular shape in the cross section, and is positionally fixed by a projection 96a formed on the inner surface of the wall 96 of the first opening 88 that houses this member.

Returning to FIG. 4, attention should be focused on a width dimension W1 of the center indication light guiding member 86 and a width Wo of the lens 94a of each optical axis Oax. The width dimension W1 of the center indication light guiding member 86 has been designed to be large as compared with a conventional one such that the width dimension W1 of the center indication light guiding member 86 is almost equal to the width Wo of the lens 94a of each optical axis Oax. Then, the width Wo of the lens 94a of each optical axis Oax is almost equal to a width of the detection surface 10 sandwiched between the two projections 8, 8. That is, the width W of the spacing between the two projections 8, 8, namely, the detection surface, has been minimized, and the width dimension W1 of the center indication light guiding member 86 has been expanded until it becomes almost equal to the width W of the detection surface, to thereby enhance the brightness of the center indicator lamp 42.

Figure 24:
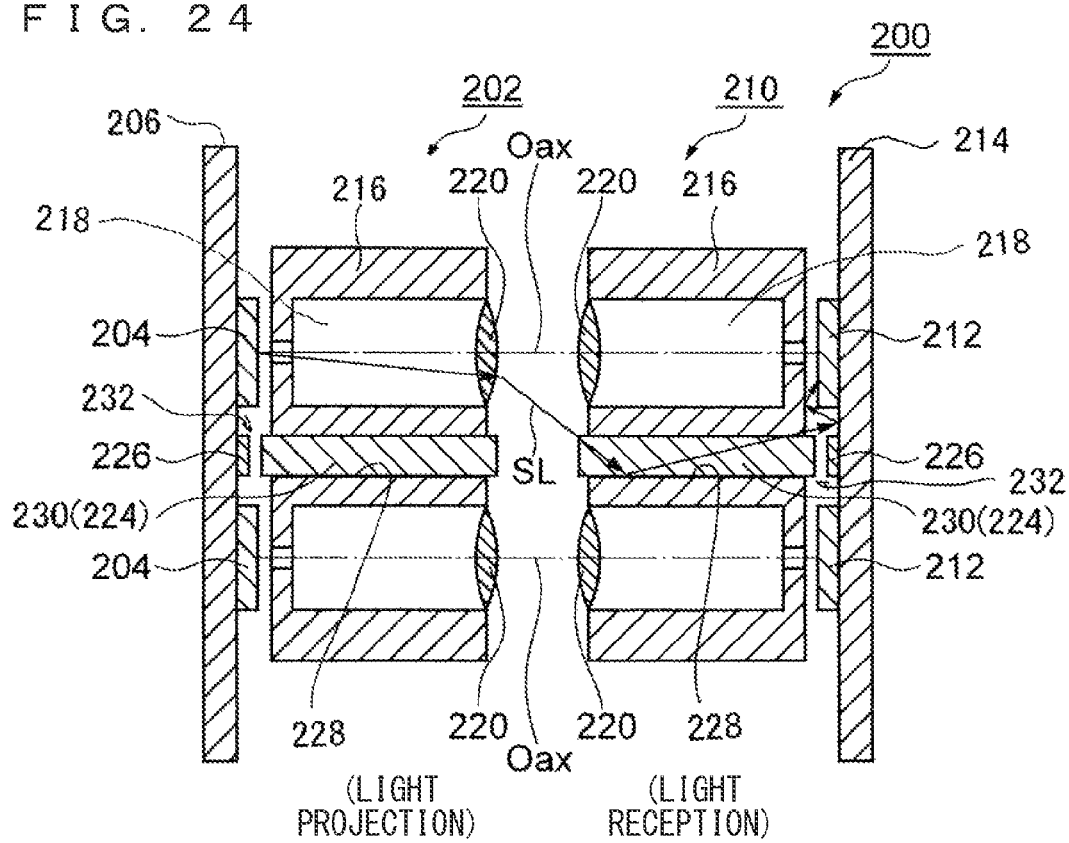
FIG. 24 is a view for explaining a problem of stray light, and illustrates a phenomenon in which the stray light passes through a light guiding member on the receiver side and is incident on a light-receiving element.

FIG. 24 is a sectional view of a main part of a multiple optical-axis photoelectric sensor being manufactured and sold by the present applicant. Describing a conventional multiple optical-axis photoelectric sensor 200 with reference to FIG. 24, an infrared ray light-projecting element 204 of a transmitter 202 is mounted on a circuit board 206 for a transmitter. Similarly, a light-receiving element 212 of a receiver 210 is mounted on a circuit board 214 for a receiver.

In the figure, reference numeral 216 denotes a holder, and the holder 216 has been fixed in the state of being positioned with respect to the circuit board 206 for a transmitter or the circuit board 214 for a receiver. The holder 216 has a light guiding path 218 with respect to each optical axis Oax, and a lens 220 is arranged on the light guiding path 218.

The multiple optical-axis photoelectric sensor 200 has a row of indicators 224 arranged on the same axis as the row of the optical axes Oax. When the indicator 224 located between one optical axis Oax and the other optical axis Oax is referred to as the "center indicator lamp", the center indicator lamp 224 is configured by LED light sources 226 mounted on the boards 206, 214, and a light guiding member 230 inserted in a through hole 228 in the holder 216. Light emitted by the LED light source 226 is guided by the light guiding member 230, while being diffused by reflection on the interface, and the apical surface of the light guiding member 230 becomes a surface light source that emits uniform light.

Figure 25:
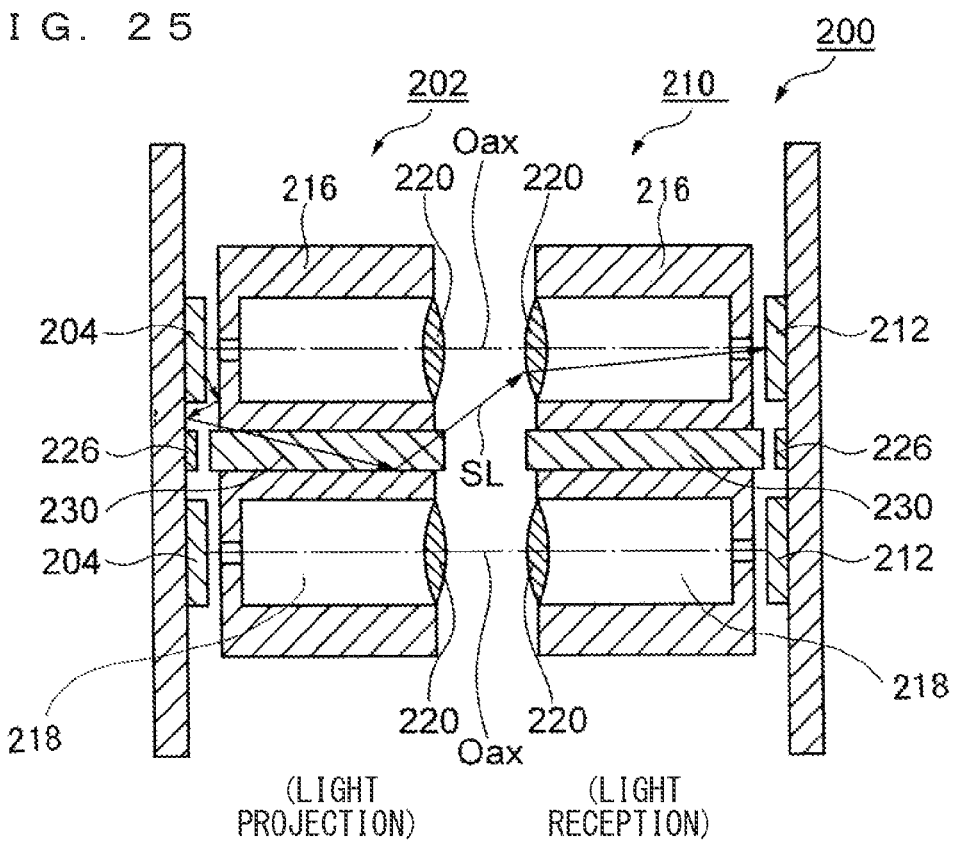
FIG. 25 is a view for explaining the problem of stray light as in FIG. 24, and illustrates a phenomenon in which the stray light passes through a light guiding member on the transmitter side and is incident on the light-receiving element.

In the progression of development of increasing a cross sectional area of the light guiding member 230 for enhancing the visibility of the center indicator lamp 224, a problem of stray light occurs. FIGS. 24 and 25 are views for explaining the problem of stray light, in which light emitted by the optical axis Oax induces an erroneous operation of another optical axis Oax adjacent thereto via the expanded light guiding member 230. In the figure, reference symbol SL denotes stray light. FIG. 24 illustrates a phenomenon that part of infrared ray beams emitted from a transmitter 202 gets into the light guiding member 230 of the receiver 210, and the stray light SL is incident on the light-receiving element 212 via this light guiding member 230. On the other hand, FIG. 25 illustrates a phenomenon that this stray light out of the transmitter 202 is received via the light guiding member 230 of the transmitter 202.

It is also one of factors of this problem that a gap 232 exists between the board 206 or 214 and the holder 216. However, the gap 232 is essential in terms of preventing the board 206 or 214 and the holder 216 from interfering with each other due to a manufacturing error.

As a method for coping with this problem of stray light, the following methods can be considered.

(1) The indicator lamp 224 is located in a position far away from the optical axis Oax.

(2) The indicator lamp 224 is not provided between the optical axes Oax, Oax.

(3) Intensity of light emitted by the light-projecting element 204 is weakened.

(4) An ON threshold value of the receiver 210 is set to a high value so that the receiver 210 is not reacted even when stray light is incident on the light-receiving element 212.

(5) A size of the transmitter 202 is reduced to lower a light amount of stray light.

As for the coping methods of above (1) to (5), for example, in the multiple optical-axis photoelectric sensor with a specification in which the maximum allowable distance between the transmitter 202 and the receiver 210 is relatively short, the coping methods of (3) and (4) can be permitted, and the coping method of (5) can be permitted since the multiple optical-axis photoelectric sensor is often installed in a position relatively close from a viewer. However, in the multiple optical-axis photoelectric sensor with a specification in which the maximum allowable distance between the transmitter 202 and the receiver 210 is relatively long, the coping methods of (3) to (5) cannot be permitted.

At any rate, it can be said that above (1) to (5) are not essential methods for improvement. For example, when the coping method of (1): "the indicator 224 is arranged in a position far away from the optical axis Oax", is adopted, the indicator 224 gets away from the position of the light curtain. The coping method of (3) or (4) leads to deterioration in detection ability of the multiple optical-axis photoelectric sensor itself. Further, when the coping method of (5): "a size of the transmitter 202 is reduced to lower a light amount of stray light", is adopted, the indicator lamp 224 deviates from its original purpose of facilitating visual check of the position of the light curtain.

Figure 22:
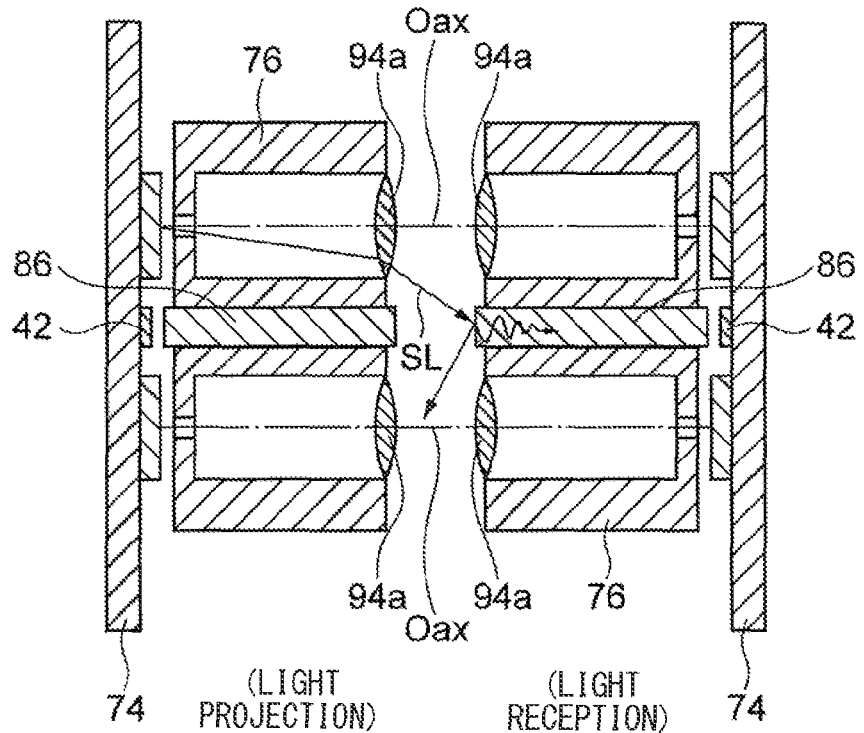
FIG. 22 is a view for explaining a function effect of an example of the first embodiment.
Figure 23:
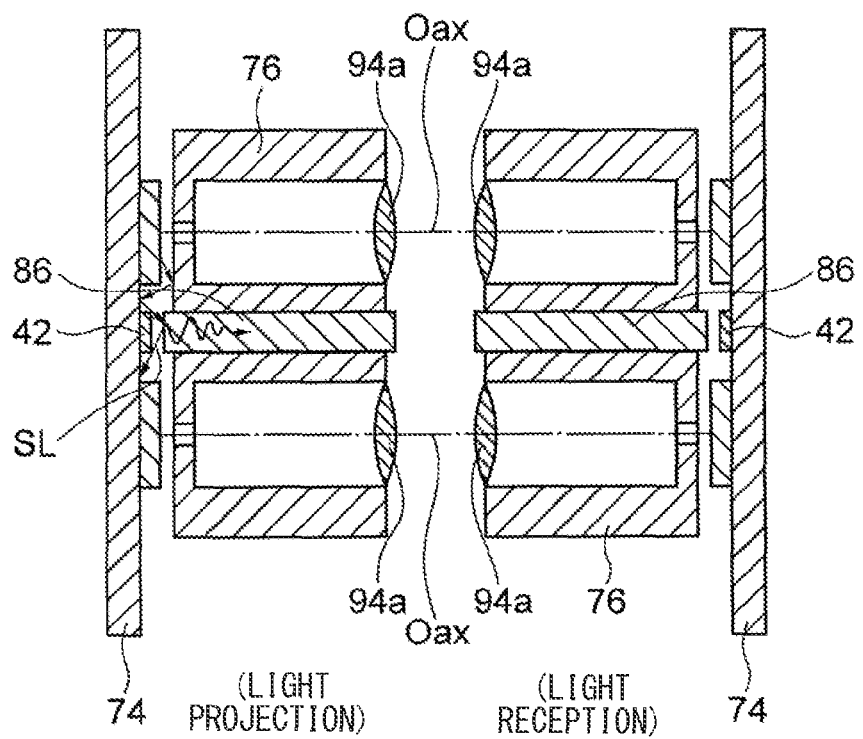
FIG. 23 is a view for explaining a function effect of the example of the first embodiment from another point of view.

According to the embodiment of the present invention, since the center indication light guiding member 86 has been provided with the function of attenuating an infrared ray, it is possible to prevent an infrared ray, which constitutes one of adjacent optical axes Oax, from being reflected on the end surface of the center indication light guiding member 86 and entering the other optical axis Oax, as illustrated in FIGS. 22 and 23. This can obviate erroneous detection associated with entry of an infrared ray between the two adjacent optical axes Oax via the center indication light guiding member 86.

As for the center indication light guiding member 86 of the 7-segment LED 46 also, if there occurs the problem of stray light, in which an infrared ray enters between the two adjacent optical axes Oax via the center indication light guiding member 86, erroneous detection associated with entry of stray light of this infrared ray can be obviated by mixing an infrared ray attenuating material into the material for the center indication light guiding member 86 as described above. The same applies to the light guiding members 91 of the OSSD indicator 48 and the interlock indicator 50.

Figure 26:
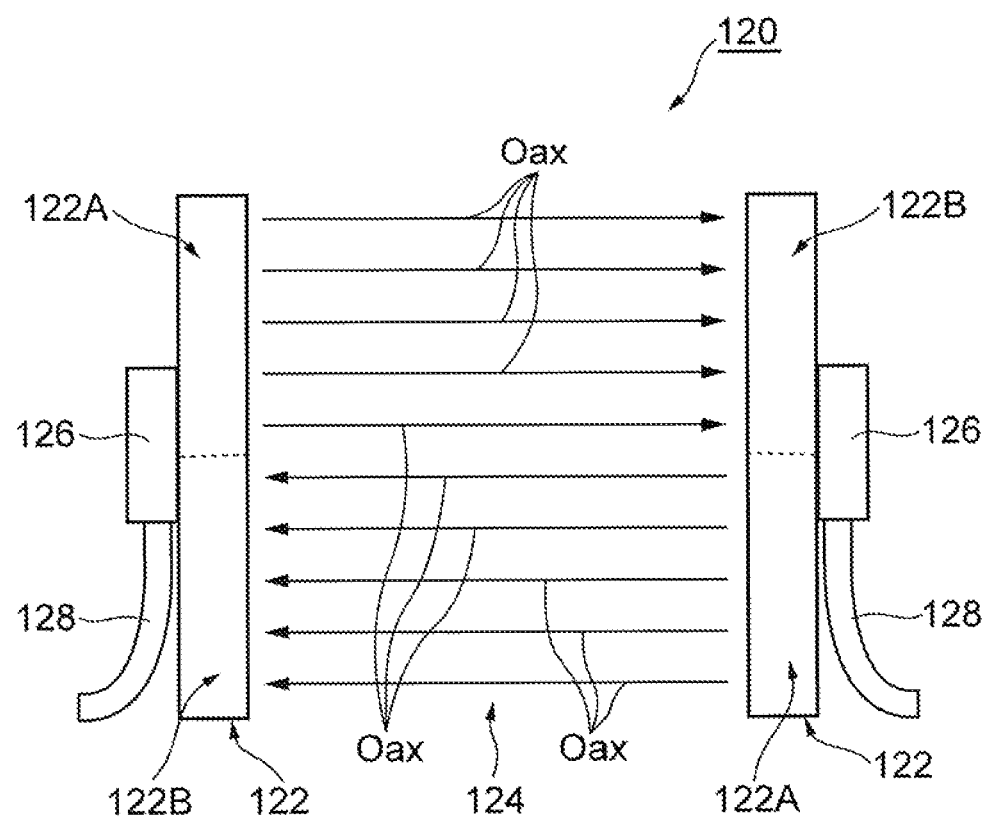
FIG. 26 is a schematic constitutional view of a multiple optical-axis photoelectric sensor of a second embodiment.
Figure 27:
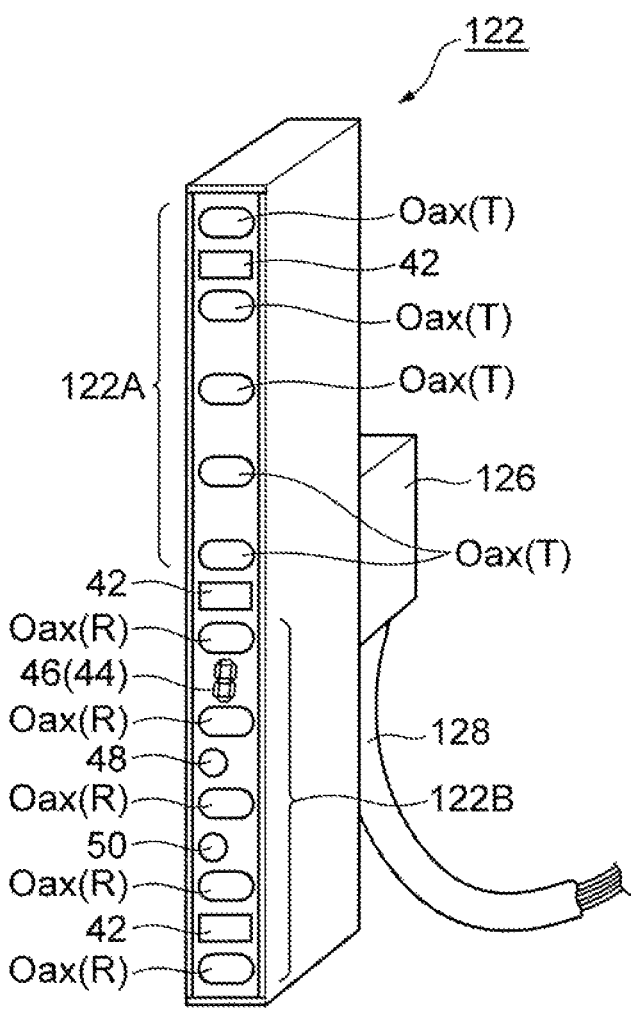
FIG. 27 is a perspective view of a common multiple optical-axis photoelectric sensor constituting the multiple optical-axis photoelectric sensor of the second embodiment, seen from a diagonally front side.

Second Embodiment (FIGS. 26 and 27)

FIG. 26 illustrates a multiple optical-axis photoelectric sensor 120 of a second embodiment. In the multiple optical-axis photoelectric sensor 120 of the second embodiment, a light curtain 124 of infrared rays is formed by use of a pair of common units 122. That is, the common unit 122 is longitudinally sectioned into halves, and a first section 122A configures a light-projecting section and a second section 122B as the other section configures a light-receiving section. In the figure, reference numeral 126 denotes a connector, and reference numeral 128 denotes a cable.

FIG. 27 is a perspective view of the common unit 122 provided with the light-projecting section 122A and the light-receiving section 122B, seen from a diagonally front side. The same elements as those in the first embodiment are provided with the same reference numerals, and descriptions thereof are omitted. In the common unit 122, an almost entire region of the front surface is taken as a detection surface covered with a front cover 130, and optical axes Oax are arranged at regular intervals longitudinally from one end toward the other end. That is, the common unit 122 is not provided with a pair of right and left projections 8, 8, which are arranged on the front surface of the multiple optical-axis photoelectric sensor 100 of the first embodiment described above.

In FIG. 27, the upper half of the common unit 122 is the light-projecting section 122A, and the lower half thereof is the light-receiving section 122B. Each optical axis Oax of the light-projecting section 122A is illustrated as provided with (T). Further, each optical axis Oax of the light-receiving section 122B is illustrated as provided with (R).

As can be seen from FIG. 27, also in the multiple optical-axis photoelectric sensor 120 of the second embodiment, the 7-segment indicator 46 as the second indicator 44 is disposed between adjacent optical axes Oax, Oax. Further, in the second embodiment, the OSSD indicator 48 is disposed between the other adjacent optical axes Oax, Oax, and the interlock indicator 50 is further disposed between the other adjacent optical axes Oax, Oax.

Display modes of the 7-segment indicator 46, the OSSD indicator 48, and the interlock indicator 50 are the same as those in the first embodiment described with reference to FIGS. 6 to 11.

Further, also in the common unit 122, the plurality of first indicators (center indicator lamps) 42 are arranged on a row of the optical axes Oax, and each center indicator lamp 42 is arranged between adjacent optical axes Oax, Oax.

Moreover, also for the inner structure concerning stray light, substantially the same structure as that in the first embodiment described with reference to FIGS. 20 to 23 has been adopted.

This can suppress reflection of an infrared ray from the optical axis Oax(T) of the light-projecting section 122A on the end surface of the center indication light guiding member 86 (FIGS. 20, 21) for the center indicator lamp 42 of the light-receiving section 122B, or attenuate the infrared ray inside the center indication light guiding member 86. Thus, stray light of the infrared ray can be prevented from entering the optical axis Oax(R) on the light-receiving side via the center indication light guiding member 86 arranged in the light-receiving section 122B.

Similarly, by suppressing reflection of an infrared ray from the optical axis Oax(T) of the light-projecting section 122A on the end surface of the center indication light guiding member 86 of the light-projecting section 122A, or attenuating the infrared ray inside the center indication light guiding member 86, stray light of the infrared ray can be prevented from entering the optical axis Oax(R) on the light-receiving side via the center indication light guiding member 86 arranged in the light-projecting section 122A.

What is claimed is:

1. A multi-optical-axis photoelectric sensor, which is provided with a longitudinally extending detection surface of an elongated case and arrayed with a plurality of optical axes at regular intervals in agreement with the longitudinally extending detection surface, the sensor comprising:
    an inter-optical-axis indication unit provided between two adjacent optical axes, including
        (a) an error indicator capable of displaying an error state,
        (b) a safe output indicator configured to display a safe output state of the multi-optical-axis photoelectric sensor, and
        (c) an interlock indicator configured to display the interlock state; and
    a display controlling unit configured to cause the error indicator to display the error state.

2. The multi-optical-axis photoelectric sensor according to claim 1, wherein the error indicator is display-switchable and is capable of displaying a plurality of types of errors as the error state.

3. The multi-optical-axis photoelectric sensor according to claim 2, wherein the error indicator is
    capable of performing switch-displays of the error state and at least one piece of information out of a control input state, a safe special function state, and a synchronization type.

4. The multi-optical-axis photoelectric sensor according to claim 2, wherein the error indicator is configured by a 1-digit 7-segment indicator.

5. The multi-optical-axis photoelectric sensor according to claim 4, wherein, when information exceeding an amount of information displayable at once by the 1-digit 7-segment indicator is to be displayed, the information is divided and displayed in a time-series manner.

6. The multi-optical-axis photoelectric sensor according to claim 1, further comprising a plurality of light entrance/light interception indicators, which are arrayed along a row of the optical axes of the multi-optical-axis photoelectric sensor and which display states of light entrance/light interception of the optical axis.

7. The multi-optical-axis photoelectric sensor according to claim 6, wherein
a row of the plurality of light entrance/light interception indicators is arranged on the row of the optical axes, and
each of the light entrance/light interception indicators is arranged between two adjacent optical axes.

8. The multi-optical-axis photoelectric sensor according to claim 1, wherein the light entrance/light interception indicator is configured by a light source and a light guiding member.

9. The multi-optical-axis photoelectric sensor according to claim 8, wherein
an optical axis of the multi-optical-axis photoelectric sensor is configured by an infrared beam, and
the light guiding member is made of a material that absorbs an infrared ray.

10. The multi-optical-axis photoelectric sensor according to claim 8, wherein
an optical axis of the multi-optical-axis photoelectric sensor is configured by an infrared beam, and
an end surface of the light guiding member is covered with a film that absorbs an infrared ray.

11. The multi-optical-axis photoelectric sensor according to claim 1, wherein
projections projecting forward and extending longitudinally are provided on both sides of a front surface of the elongated case, and
the detection surface is arranged in a region sandwiched between the pair of projections.

* * * * *